United States Patent
Nakashiba et al.

(10) Patent No.: US 10,416,382 B2
(45) Date of Patent: Sep. 17, 2019

(54) SEMICONDUCTOR DEVICE

(71) Applicant: RENESAS ELECTRONICS CORPORATION, Tokyo (JP)

(72) Inventors: Yasutaka Nakashiba, Ibaraki (JP); Shinichi Watanuki, Ibaraki (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/176,327

(22) Filed: Oct. 31, 2018

(65) Prior Publication Data
US 2019/0187370 A1  Jun. 20, 2019

(30) Foreign Application Priority Data
Dec. 20, 2017 (JP) ................................. 2017-244282

(51) Int. Cl.
G02B 6/10 (2006.01)
G02B 6/122 (2006.01)
G02B 6/12 (2006.01)

(52) U.S. Cl.
CPC .... G02B 6/122 (2013.01); *G02B 2006/12061* (2013.01); *G02B 2006/12097* (2013.01); *G02B 2006/12142* (2013.01)

(58) Field of Classification Search
CPC .......... G02B 6/122; G02B 2006/12061; G02B 2006/12142; G02B 2006/12097
See application file for complete search history.

(56) References Cited

U.S. PATENT DOCUMENTS

| 8,532,440 | B2 * | 9/2013 | Ushida | G02F 1/025 385/131 |
| 8,936,962 | B2 * | 1/2015 | Fujikata | G02F 1/2257 438/79 |
| 9,417,469 | B2 * | 8/2016 | Abel | G02F 1/025 |
| 9,703,125 | B2 | 7/2017 | Fujikata et al. | |
| 9,927,637 | B2 * | 3/2018 | Ogawa | G02F 1/2257 |
| 10,025,159 | B2 * | 7/2018 | Fujikata | G02F 1/225 |
| 2012/0257850 | A1 * | 10/2012 | Fujikata | G02F 1/025 385/3 |

FOREIGN PATENT DOCUMENTS

WO 2010/103891 A1 9/2010
WO 2014/155450 A1 10/2014

* cited by examiner

*Primary Examiner* — Ellen E Kim
(74) *Attorney, Agent, or Firm* — McDermott Will & Emery LLP

(57) ABSTRACT

In an optical waveguide section of an SIS type having a configuration of stacking a second semiconductor layer over a first semiconductor layer with a dielectric layer interposed, the first semiconductor layer is electrically coupled to a first electrode at a first lead-out section where the second semiconductor layer is not stacked. Further, the second semiconductor layer is electrically coupled to a second electrode at a second lead-out section not overlapping with the first semiconductor layer. As a result, when a contact hole for forming the second electrode is formed by dry etching, the dielectric layer between the first semiconductor layer and the second semiconductor layer is not damaged or broken and hence short-circuit failure between the first semiconductor layer and the second semiconductor layer can be prevented. The reliability of the optical waveguide section therefore can be improved.

14 Claims, 26 Drawing Sheets

FIG. 9
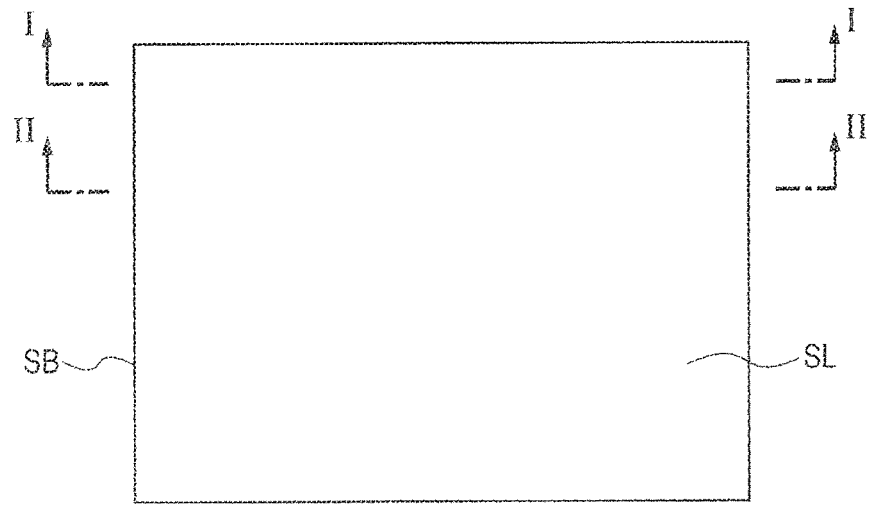
FIG. 10
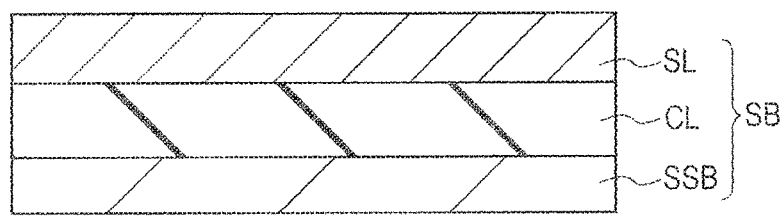
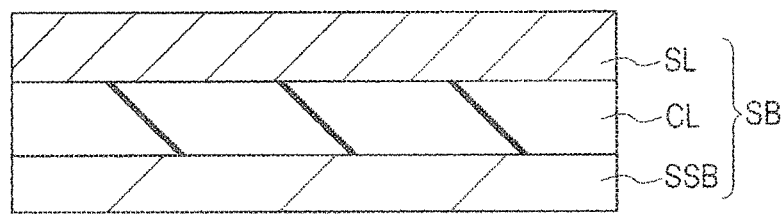

FIG. 11
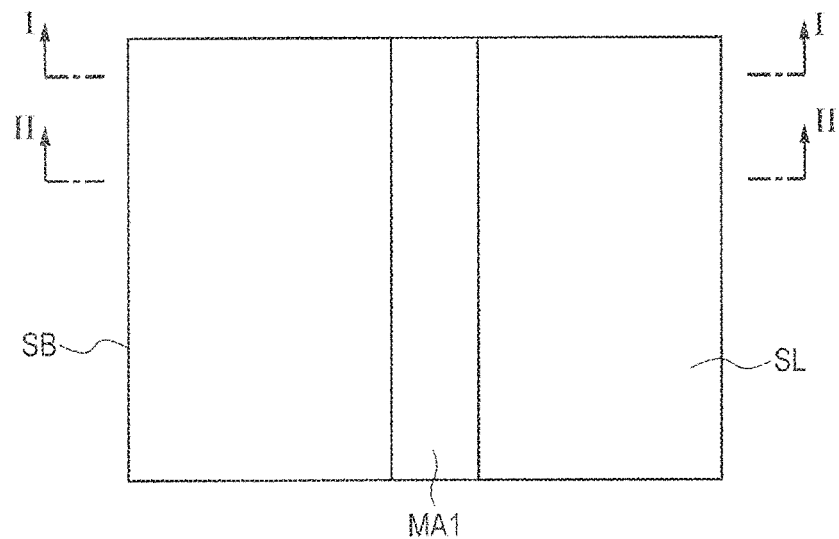
FIG. 12
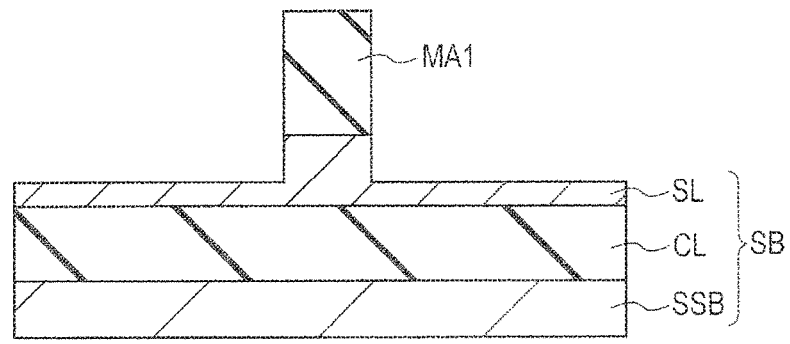
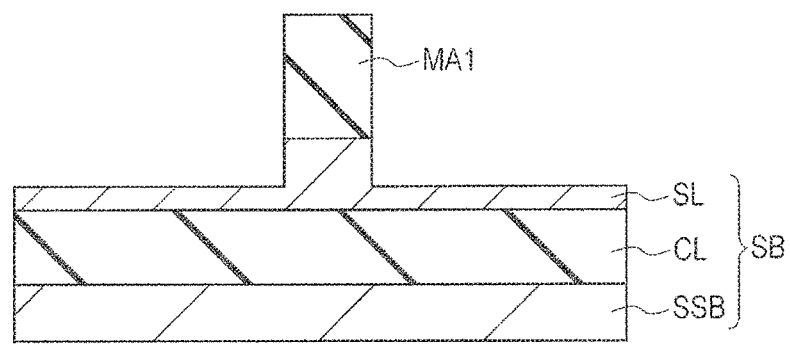

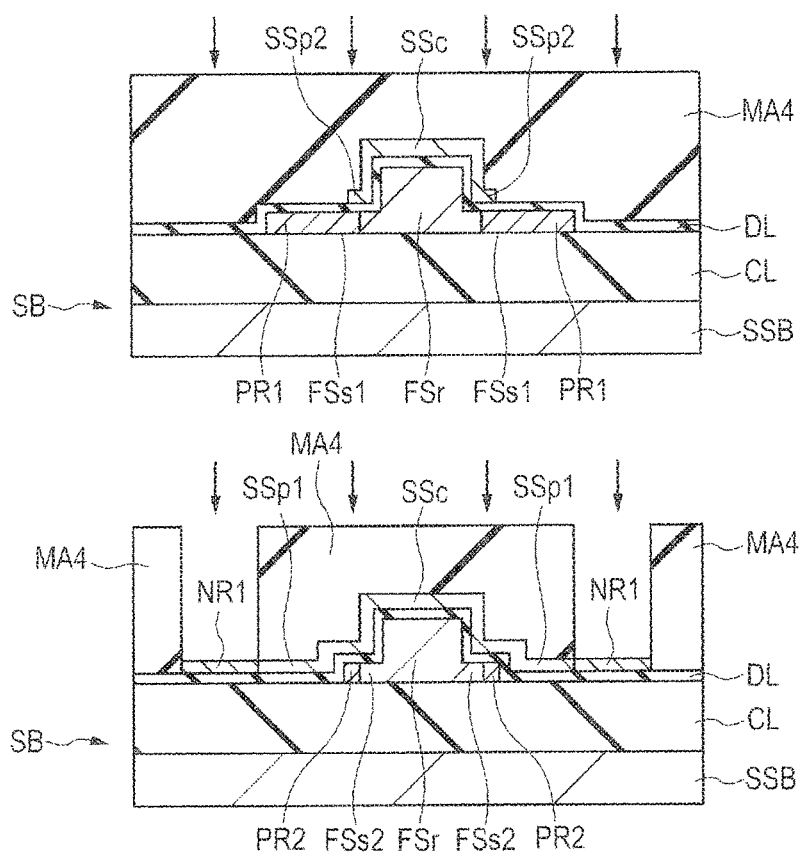
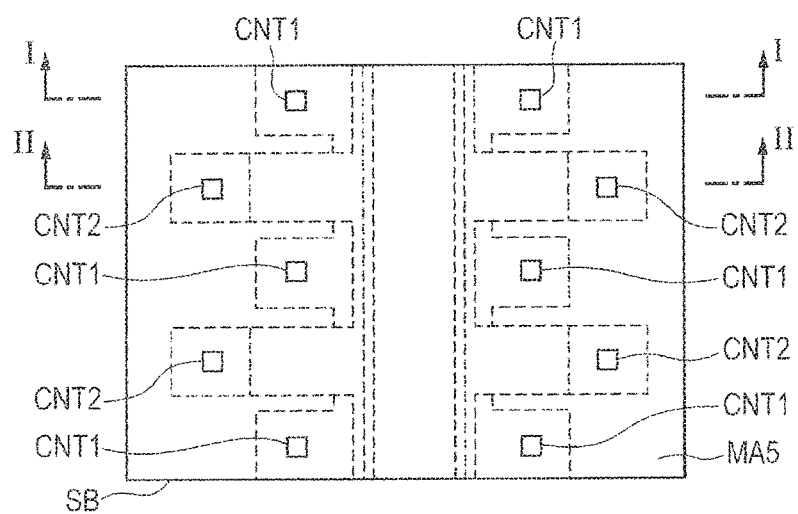

SEMICONDUCTOR DEVICE

CROSS-REFERENCE TO RELATED APPLICATIONS

The disclosure of Japanese Patent Application No. 2017-244282 filed on Dec. 20, 2017 including the specification, drawings and abstract is incorporated herein by reference in its entirety.

BACKGROUND

The present invention relates to: a semiconductor device; and a technology of a semiconductor device having an optical device for example.

There is a silicon photonics device of an SIS (Semiconductor Insulator Semiconductor) type as an example of an optical modulator configuring an optical device. The device is configured by: forming a second semiconductor layer with a dielectric layer interposed over a first semiconductor layer formed with an insulating layer interposed over a substrate; and further covering them with an insulating film. The first semiconductor layer configures an optical waveguide (core section) mainly to transmit an optical signal and the second semiconductor layer configures a control electrode mainly to control the transmission state of the optical signal. Further, the insulating film covering the insulating layer as the base of the first semiconductor layer and the first and second semiconductor layers comprises a material having a refractive index of light for a signal lower than the first semiconductor layer and configures a clad section.

Such a silicon photonics device of an SIS type is described in Patent Literatures 1 and 2 for example. In Patent Literature 1, described is a configuration of stacking a transparent electrode that is optically transparent at least in a near-infrared wavelength region over a second conductivity type semiconductor layer formed over a dielectric layer. Further, in Patent Literature 2, described is a configuration of setting the height of a heavily doped region adjacent to a rib section configuring a first silicon semiconductor layer of a rib waveguide shape with a slab section interposed so as to be equal to the height of the rib section.

CITATION LIST

Patent Literature

Patent Literature 1: WO 2010/103891
Patent Literature 2: WO 2014/155450

SUMMARY

A silicon photonics technology: is an excellent technology that allows an optical device to be downsized (highly integrated), reduce costs, and be highly functionalized; and hence is desired to improve reliability more in practical applications.

Other problems and novel features will be obvious from the descriptions and attached drawings in the present specification.

In a semiconductor device according to an embodiment, an optical waveguide section to propagate light along a first surface of a substrate and a first insulating film to cover the optical waveguide section are formed over the first surface. The optical waveguide section has a first semiconductor layer formed over the first surface, a dielectric layer formed over the first semiconductor layer, and a second semiconductor layer formed over the dielectric layer. The first semiconductor layer has a first part to propagate light and a second part formed integrally with the first part so as not to overlap with the first part in a plan view. The second semiconductor layer has a third part formed so as to cover the first part and a fourth part formed integrally with the third part so as not to overlap with the first part and the second part in a plan view. A first coupling hole reaching the second part and a second coupling hole reaching the fourth part are formed in the first insulating film, a first electrode electrically coupled to the second part is formed in the first coupling hole, and a second electrode electrically coupled to the fourth part is formed in the second coupling hole. Then the first semiconductor layer is arranged but the second semiconductor layer is not arranged between the first electrode and the substrate and the second semiconductor layer is arranged but the first semiconductor layer is not arranged between the second electrode and the substrate.

According to an embodiment, the reliability of a semiconductor device having an optical device can be improved.

BRIEF DESCRIPTION OF THE DRAWINGS

FIG. 9 is a plan view showing a substantial part of a semiconductor device according to First Embodiment during a manufacturing process.

FIG. 10 shows a sectional view taken on line I-I in FIG. 9 at the upper stage and a sectional view taken on line II-II in FIG. 9 at the lower stage.

FIG. 11 is a plan view showing a substantial part of the semiconductor device during a manufacturing process after the manufacturing process explained in FIG. 9.

FIG. 12 shows a sectional view taken on line I-I in FIG. 11 at the upper stage and a sectional view taken on line II-II in FIG. 11 at the lower stage.

FIG. 20 shows a sectional view taken on line I-I in FIG. 19 at the upper stage and a sectional view taken on line II-II in FIG. 19 at the lower stage.

FIG. 21 is a plan view showing a substantial part of the semiconductor device during a manufacturing process after the manufacturing process explained in FIG. 19.

Figure 1:
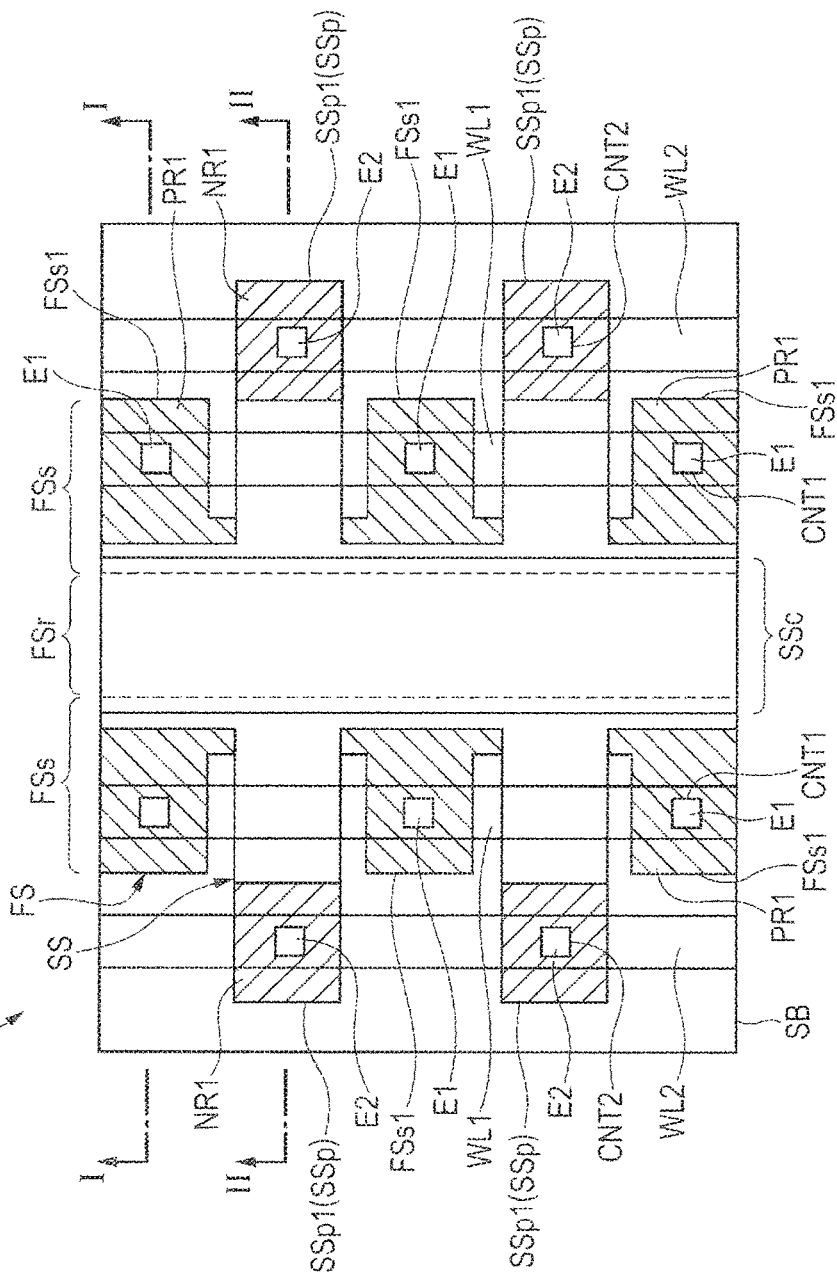
FIG. 1 is a plan view showing a substantial part of a semiconductor device according to First Embodiment.

DETAILED DESCRIPTION (Explanations on Descriptive Forms, Basic Terms, and Usages in the Present Specification)

In the present specification, embodiments: are described by being divided into a plurality of sections and the like for convenience if needed; but, unless otherwise specified, are not independent and distinct from each other and are parts of a single example, one being a partial detail of another, parts or the whole of a modified example, or the like regardless of before and after the descriptions. Further, similar parts are not explained repeatedly in principle. Furthermore, constituent components of embodiments are not essential except the case of being specified otherwise, being limited to a specific number theoretically, or being otherwise obviously from a context.

In the descriptions of embodiments and others likewise, with regard to a material, a composition, and the like, even when "K comprising B" or the like is described, the description does not exclude a case where K includes an element other than B except the case of being specified otherwise or being otherwise obviously from a context. With regard to a component for example, that means "K containing B as the main component" and the like. It goes without saying for example that, even when "a silicon member" or the like is described, the silicon member is not limited to genuine silicon and includes members containing an SiGe (silicon germanium) alloy, a multi-alloy containing silicon as the main component, another additive, and the like.

Further, in the present specification, the terms "electrode" and "wire" do not limit them functionally. For example, an "electrode" may be used as a part of a "wire" and the reverse is also acceptable. Furthermore, the terms "electrode" and "wire" include the case of being formed by integrating a plurality of "electrodes" and "wires" and other cases.

Furthermore, even when a specific numerical value or quantity is referred to, a numerical value exceeding the specific numerical value or a numerical value smaller than the specific numerical value may be included except the case of being specified otherwise, being limited to a specific number theoretically, or being otherwise obviously from a context.

Yet further, in the drawings of embodiments, identical or similar parts: are represented by an identical or similar symbol or reference number; and are not explained repeatedly in principle.

Moreover, in attached drawings, hatching and the like may sometimes be omitted even in the case of a cross section when a drawing is rather complicated or the cross section can be distinguished obviously from a space. In this regard, an outline of a background may sometimes be omitted even in the case of a closed hole in a plan view when the closed hole is obvious from the explanation and the like. Further, hatching or dotted patterning may sometimes be applied even in the case of not a cross section in order to specify that the cross section is not a space or in order to specify a boundary of a region.

In addition, in the present specification, a plan view means a view viewed from a direction perpendicular to the principal surface of a substrate.

Studies by Present Inventors

In recent years, problems, such as signal delay, generation of heat, and electromagnetic interference (EMI), in electric wiring come to the surface in coupling between electronic devices, for example between boards, between computers, and between peripherals, and optical interconnection using a silicon photonics technology is being developed to cope with the problems.

The silicon photonics technology is an optical device technology that uses silicon (Si) as a material. Further, the optical interconnection technology is a technology of exchanging signals by converting an electric signal into an optical signal or an optical signal into an electric signal, those coming from external devices or the like, and transmitting them to other external devices or the like. The optical interconnection can eliminate signal delay caused by a parasitic capacitance, signal degradation caused by the instability of a ground, and a failure caused by the radiation of EMI radiated from wiring in electric wiring.

A semiconductor chip of an opto-electric hybrid type to which silicon photonics is applied is manufactured through a semiconductor process. For example, in a semiconductor chip of an opto-electric hybrid type for optical transmission, an optical waveguide and a clad layer are formed over an Si substrate configuring the semiconductor chip. Further, over the Si substrate, a grating coupler for being optically coupled to an external waveguide (optical fiber) and the like are arranged at an end of the optical waveguide.

An optical waveguide configuring an optical modulator has an SIS (Semiconductor Insulator Semiconductor) structure for example. The SIS structure is configured by forming a semiconductor layer for control over a semiconductor layer for an optical waveguide (core) with a dielectric layer interposed. In the SIS structure, the carrier plasma effect of Si is used, a carrier density in an optical waveguide is changed, thus the refractive index of light propagating in the optical waveguide is changed, and the amplitude and phase of the light propagating in the optical waveguide are changed. Meanwhile, in the carrier plasma effect for example, if a pair of a free electron and a positive hole increases in a medium, a plasma frequency increases and a refractive index lowers.

Figure 45:
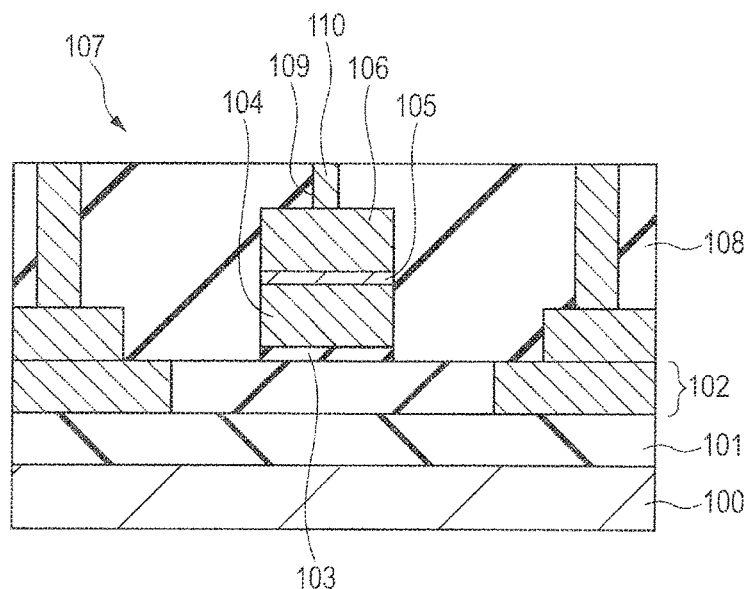
FIG. 45 is a schematic sectional view of an optical modulator in Patent Literature 1 on a plane intersecting with a propagation direction of light.

Such an optical waveguide of an SIS structure is disclosed in Patent Literatures 1 and 2 as stated earlier. FIG. 45 shows a schematic sectional view of an optical modulator in Patent Literature 1 on a plane intersecting with (perpendicular to) a propagation direction of light. A p-type semiconductor layer 102 is formed over a substrate 100 with an oxide layer 101 interposed. An n-type semiconductor layer 104 is formed over the semiconductor layer 102 with a thin dielectric layer 103 interposed. Further, a conductive layer 106 is formed immediately above the semiconductor layer 104 with a silicide layer 105 interposed. Furthermore, an oxide clad 108 is formed so as to cover an optical waveguide 107 of such an SIS structure. Moreover, a contact hole 109 reaching the conductive layer 106 is formed in the oxide clad 108 and a metal electrode 110 is formed in the contact hole 109 in the state of being coupled to the conductive layer 106. On this occasion, when the contact hole 109 for forming the metal electrode is formed in the oxide clad 108 by plasma etching or the like, it sometimes happens that the thin dielectric layer 103 between the semiconductor layer 102 and the semiconductor layer 104 is damaged or broken by charge-up or the like and the semiconductor layer 102 and the semiconductor layer 104 short-circuit. That is, usually, since plasma is excited by high-frequency discharge, electron current having a negative charge and ion current having a positive charge flow alternatively into the substrate 100 and the electrical charge remains over the surface of the substrate 100. As a result, a large voltage is applied by the remaining charge to the thin dielectric layer 103 between the semiconductor layer 102 and the semiconductor layer 104, resultantly the dielectric layer 103 is damaged or broken, and the semiconductor layer 102 and the semiconductor layer 104 short-circuit. There is therefore the problem of deteriorating the reliability of the optical modulator.

Figure 46:
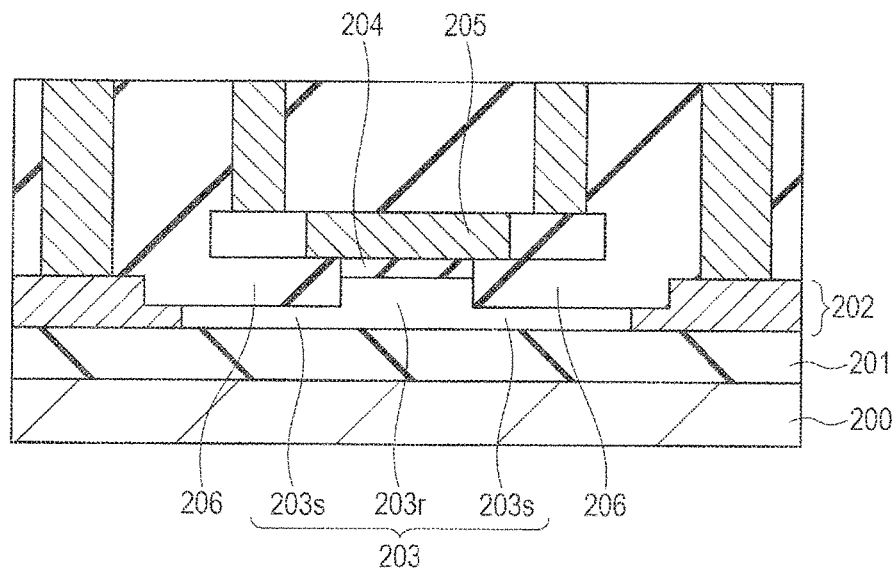
FIG. 46 is a schematic sectional view of an optical modulator in Patent Literature 2 on a plane intersecting with a propagation direction of light.

Meanwhile, FIG. 46 shows a schematic sectional view of an optical modulator in Patent Literature 2 on a plane intersecting with (perpendicular to) a propagation direction of light. A p-type first Si semiconductor layer 202 is formed over an Si substrate 200 with an oxide layer 201 interposed. A rib waveguide 203 is formed in the center of the first Si semiconductor layer 202 in a width direction. The rib waveguide 203 has a protrusion 203r and a slab section 203s coupled on both the sides. An n-type semiconductor layer 205 is formed over the upper surface of the protrusion 203r of the rib waveguide 203 with a dielectric layer 204 interposed. The semiconductor layer 205 is wider than the width of the protrusion 203r in a plan view and protrudes so as to overlap with the slab section 203s on both the sides in a plan view. On this occasion, in the manufacturing, since the n-type semiconductor layer 205 protrudes, a recess between the n-type semiconductor layer 205 and the slab section 203s has to be filled with an insulating film 206 and flattened and there are the problems of increasing manufacturing processes and making the manufacturing itself difficult.

First Embodiment

<Configuration Example of Semiconductor Device>

Figure 2:
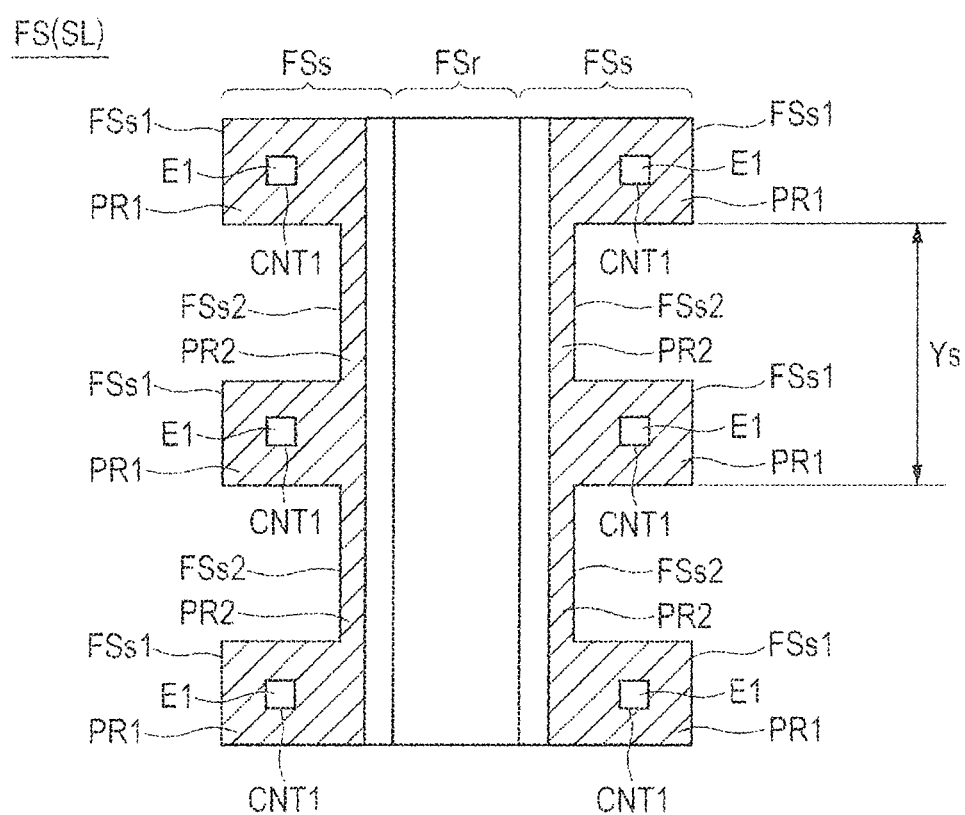
FIG. 2 is a plan view showing a substantial part of a first semiconductor layer configuring the semiconductor device in FIG. 1.
Figure 3:
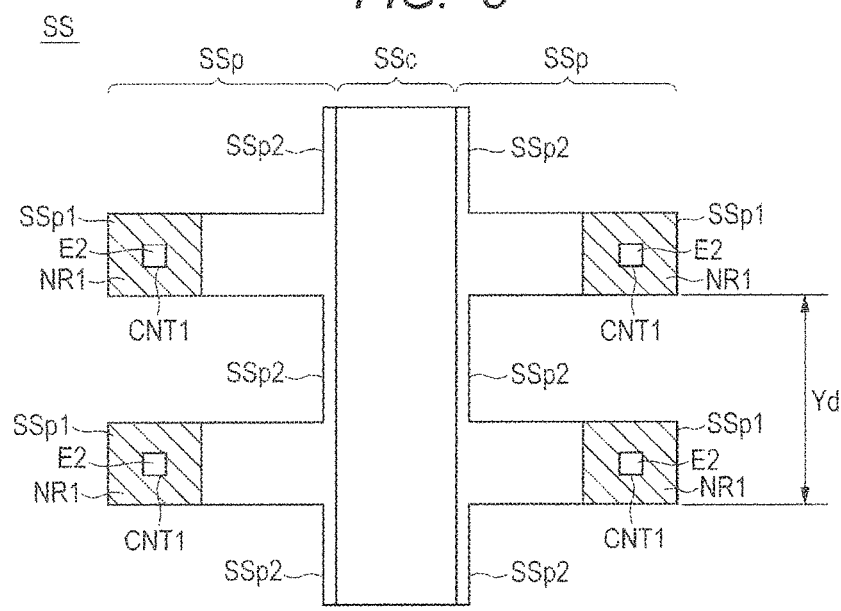
FIG. 3 is a plan view showing a substantial part of a second semiconductor layer configuring the semiconductor device in FIG. 1.
Figure 4:
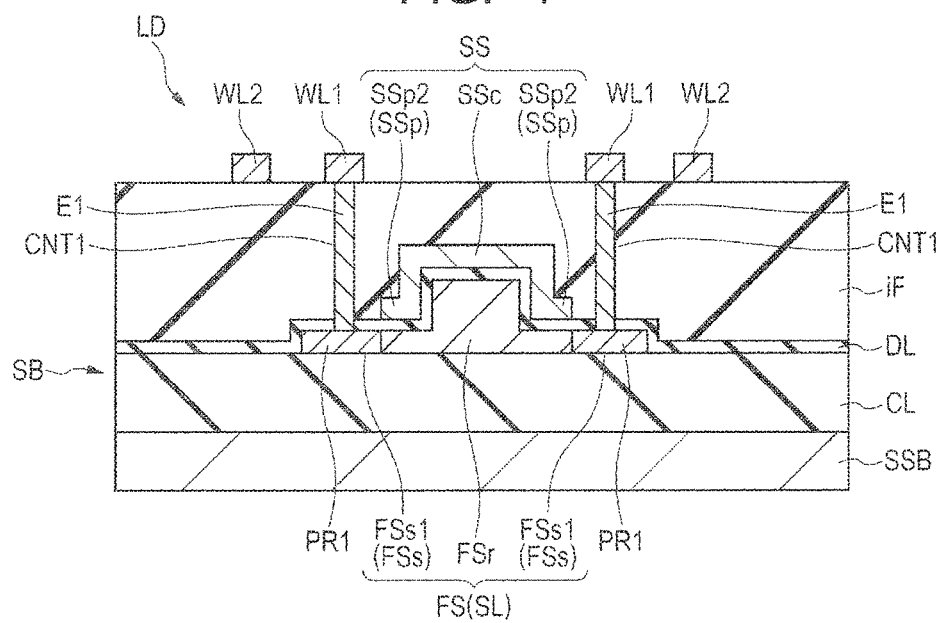
FIG. 4 is a sectional view taken on line I-I in FIG. 1.
Figure 5:
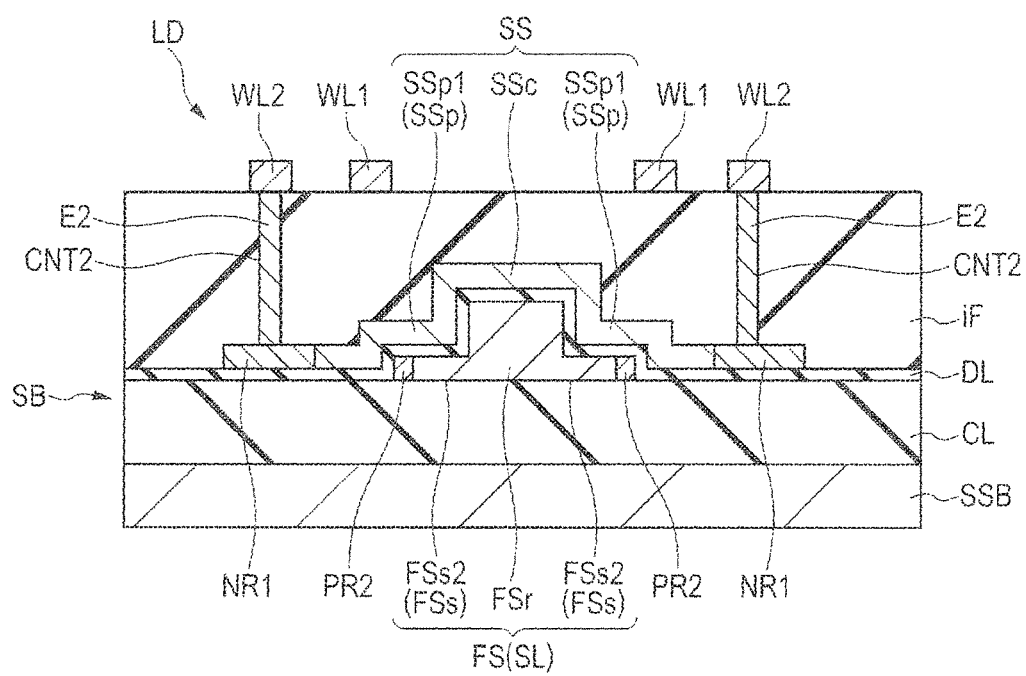
FIG. 5 is a sectional view taken on line II-II in FIG. 1.
Figure 6:
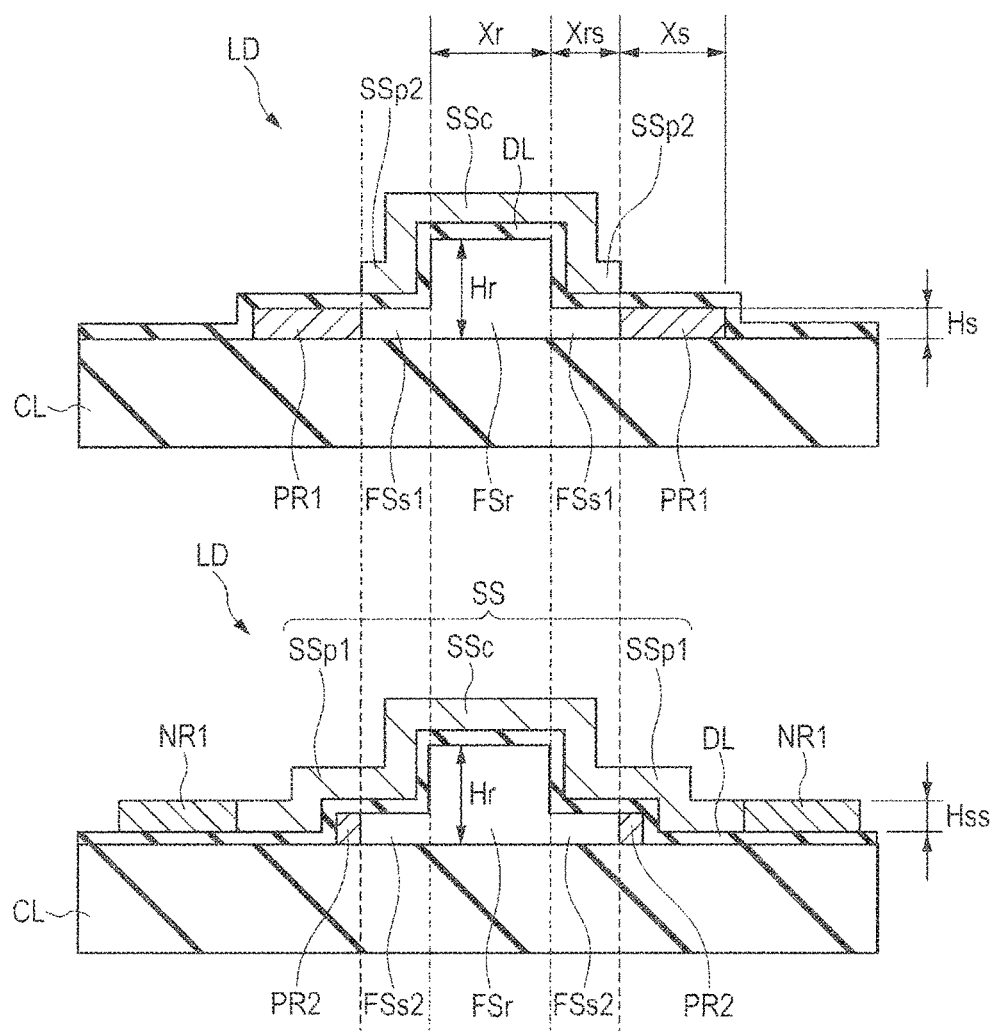
FIG. 6 comprises enlarged sectional views showing substantial parts of the semiconductor device in FIGS. 4 and 5.

FIG. 1 is a plan view showing a substantial part of a semiconductor device according to First Embodiment, FIG. 2 is a plan view showing a substantial part of a first semiconductor layer configuring the semiconductor device in FIG. 1, FIG. 3 is a plan view showing a substantial part of a second semiconductor layer configuring the semiconductor device in FIG. 1, FIG. 4 is a sectional view taken on line I-I in FIG. 1, FIG. 5 is a sectional view taken on line II-II in FIG. 1, and FIG. 6 comprises enlarged sectional views showing substantial parts of the semiconductor device in FIGS. 4 and 5.

A substrate SB shown in FIG. 1 configuring a semiconductor device according to First Embodiment comprises an SOI (Silicon on Insulator) substrate having a support substrate SSB, an insulating layer CL formed over the support substrate SSB, and a semiconductor layer SL formed over the insulating layer CL as shown in FIGS. 4 and 5. Here, the substrate SB: is not limited to a substrate having the support substrate SSB; and may also be a substrate that does not have a support substrate itself and has a double-layer structure of forming a semiconductor layer over an insulating layer (sapphire) functioning as a support substrate like an SOS (Silicon on Sapphire) substrate for example.

The support substrate SSB of the lowermost layer comprises a p-type silicon (Si) monocrystal having a plane orientation of (100) and a resistivity of about 5 to 50 $\Omega$cm for example. The insulating layer CL in the middle is also called a BOX (Buried Oxide) layer and comprises a silicon oxide ($SiO_2$) film for example. The thickness of the insulating layer CL is 1 µm or more for example or specifically about 2 to 3 µm for example in order to reduce optical loss. Further, the semiconductor layer SL of the uppermost layer is also called an SOI layer or an element forming layer and is a layer formed by thinning a p-type Si monocrystal substrate having a plane orientation of (100) and a resistivity of about 5 to 50 Ωcm for example. The thickness of the semiconductor layer SL is about 180 to 250 nm for example.

Si configuring the semiconductor layer SL is a material that transmits the light of a 1.3 to 1.6 µm band for optical communication (communication wavelength band) for example and the refractive index of Si is 3.5 for example in the light of the relevant wavelength band. Such a semiconductor layer SL comprising Si configures a core section to propagate light as it will be described later. In contrast, the refractive index of $SiO_2$ configuring the insulating layer CL is lower than the refractive index of the semiconductor layer SL and is 1.45 to 1.5 for example in the light of the relevant wavelengths and the insulating layer CL configures a clad section.

Over the principal surface (first surface) of such a substrate SB, an optical waveguide section LD and an insulating film iF covering the optical waveguide section LD are formed as shown in FIGS. 1, 4, and 5. The insulating film iF comprises a material identical to the insulating layer CL and configures the clad section. The thickness of the insulating film iF is 1 µm or more for example or specifically about 2 to 5 µm for example in order to reduce optical loss. By surrounding the optical waveguide section LD by the insulating layer CL of the lower layer and the insulating film iF of the upper layer in this way, the leakage of light propagating in the optical waveguide section LD can be reduced and hence the propagation loss of the light can be reduced.

The optical waveguide section LD: is a component of propagating light along the principal surface of the substrate SB; and has an SIS structure having a first semiconductor layer FS formed over the insulating layer CL, a dielectric layer DL formed over the first semiconductor layer FS, and a second semiconductor layer SS formed yet over the dielectric layer DL.

The first semiconductor layer FS: comprises the semiconductor layer SL stated above; and has a convex shape in a cross section intersecting with a propagation direction of light. That is, the first semiconductor layer FS integrally has a relatively thick rib section (first part) FSr and relatively thin slab sections (second parts) FSs formed adjacently on both the sides of the rib section FSr in a width direction (a short direction, a direction intersecting with a propagation direction of light and being parallel with the principal surface of the substrate SB).

The rib section FSr mainly has the function of a core section propagating light. The rib section FSr: is arranged in the center of the first semiconductor layer FS in a width direction (a short direction, a direction intersecting with a propagation direction of light and being parallel with the principal surface of the substrate SB); and has the pattern of a band extending in a propagation direction of light (a vertical direction in FIGS. 1 and 2) as shown in FIGS. 1 and 2. As shown in FIG. 6, the width Xr of the rib section FSr is constant in a propagation direction of light (a vertical direction in FIG. 6) and is about 300 to 400 nm for example.

Further, as shown in FIGS. 4 and 5, the rib section FSr is formed so as to be thicker than the slab sections FSs and protrude upward from the upper surfaces of the slab sections FSs in a sectional view. That is, the height from the upper surface of the insulating layer CL to the upper surface of the rib section FSr is larger than the height from the upper surface of the insulating layer CL to the upper surfaces of the slab sections FSs. As shown in FIG. 6, the height (thickness) Hr of the rib section FSr is constant in a propagation direction of light. Further, the height (thickness) Hr of the rib section FSr is equal to the height (thickness) of the semiconductor layer SL and is about 180 to 250 nm for example. Furthermore, the height (thickness) Hs of the slab sections FSs is constant in a propagation direction of light and is about 100 nm for example.

The slab sections FSs have the function of electrodes mainly to supply a potential to the rib section FSr. The slab sections FSs are arranged so as not to overlap with the rib section FSr. As shown in FIG. 2, the slab sections FSs integrally have a plurality of lead-out sections (fifth parts) FSs1 and coupling sections (seventh parts) FSs2 formed so as to couple two lead-out sections FSs1 adjacent to each other in the lead-out sections FSs1.

A plurality of the lead-out sections FSs1 are arranged in a propagation direction of light as shown in FIGS. 1 and 2. The lead-out sections FSs1 are desirably arranged so as not to be equally spaced. Otherwise, when the lead-out sections FSs1 are arranged at an equal interval Ys, the interval Ys desirably satisfies the following Expression 1. By this, it is possible to prevent the light propagating in an optical modulation section LD from attenuating by Bragg reflection and the transmission loss of the light from being generated.

$$d \neq m\lambda/2n \qquad \text{(Expression 1)}$$

Here, m is an integer and n is a refractive index of Si. Further, as shown in FIGS. 1, 2, and 4, an electrode (first electrode) E1 is electrically coupled to each of the lead-out sections FSs1.

Each of the electrodes E1: is an electrode for supplying a reference potential (0 V at a ground) for example to the first semiconductor layer FS; and is configured by embedding a conductor film into a contact hole (first coupling hole) CNT1 pierced in the insulating film iF and the dielectric layer DL. A silicide layer may also be formed over the upper surface of the first semiconductor layer FS (lead-out section FSs1) exposed from the bottom surface of the contact hole CNT1. On this occasion, the silicide layer is also included in the electrode E1. Then the first semiconductor layer FS (lead-out section FSs1) is arranged but the second semiconductor layer SS is not arranged between the electrode E1 and the substrate SB (insulating layer CL). That is, the electrode E1 comes into contact with the lead-out section FSs1, where the second semiconductor layer SS is not stacked, in the first semiconductor layer FS. In other words, the first semiconductor layer FS comes into contact with and is electrically coupled to the electrode E1 at the lead-out section FSs1 where the second semiconductor layer SS is not stacked.

Further, the electrodes E1 are electrically coupled to relevant common wires WL1. Each of the common wires WL1 has the pattern of a band extending in a propagation direction of light so as not to overlap with the rib section FSr in a plan view as shown in FIGS. 1 and 4. Each of the electrodes E1 and each of the common wires WL1 are integrally formed with a conductor film such as titanium (Ti)/titanium nitride (TiN)/aluminum (Al), Ti/TiN/copper (Cu), or Ti/TiN/tungsten (W) for example. Here, each of the electrodes E1 and each of the common wires WL1 may also be formed in separate units. Further, although the case of forming the wires WL1 in a first layer is exemplified for simplifying the explanation here, the wires WL1 are not limited to the case and may also be formed in a second layer or a third layer over the first layer.

Furthermore, as shown in FIGS. 1, 2 and 4, p$^+$-type semiconductor regions (first semiconductor regions) PR1 are formed at parts, with which the electrodes E1 comes into contact, of the lead-out sections FSs1. An impurity concentration of the semiconductor regions PR1 is set so as to be higher than an impurity concentration of the rib section FSr so that the contact state of the electrodes E1 and the lead-out sections FSs1 may be an ohmic contact state. As shown in FIG. 6, the length Xs of the semiconductor regions PR1 may be any length as long as the length is the extent of allowing a carrier to be supplied and is about 0.5 μm for example. Further, a distance Xrs from an end of the rib section FSr in a width direction to the ends of the semiconductor regions PR1 is preferably large to some extent from the view point of inhibiting light leaking outside the rib section FSr from being scattered by impurities in the interior of the semiconductor regions PR1 and the propagation loss of the light from being generated when the light propagates in the rib section FSr that comes to be an optical waveguide. The distance Xrs is larger than 1 μm (=1.5/1.45) for example.

Moreover, as shown in FIGS. 2 and 5, p$^+$-type semiconductor regions (second semiconductor regions) PR2 are formed in the coupling sections FSs2 stated earlier integrally with the p$^+$-type semiconductor regions PR1. That is, the p$^+$-type semiconductor regions PR1 in the lead-out sections FSs1 are electrically coupled to each other through the p$^+$-type semiconductor regions PR2 in the coupling sections FSs2 formed between the lead-out sections FSs1. Consequently, resistance between the lead-out sections FSs1 can be reduced. As a result, a reference potential can be supplied to the first semiconductor layer FS efficiently and hence the power consumption at the optical waveguide section LD can be reduced. Further, a reference potential can be supplied to the wide range of the first semiconductor layer FS stably and hence the operational stability of the optical waveguide section LD can be improved. Meanwhile, a configuration of not forming the semiconductor regions PR2 in the coupling sections FSs2 of the first semiconductor layer FS is also acceptable. Here, hatching is applied to the semiconductor regions PR1 and PR2 in FIGS. 1 and 2 in order to make the drawings easy to see.

The dielectric layer DL comprises silicon oxide for example. The thickness of the dielectric layer DL: is set so as to be thin relatively to the light of a communication wavelength band (1.3 to 1.6 μm) so as not to influence the transmission of an optical signal; and is about 10 nm for example. As it will be described later, the dielectric layer DL comprises a deposited film formed by a CVD (Chemical Vapor Deposition) method or the like for example. Consequently, as shown in FIGS. 4 and 5, the dielectric layer DL is formed also over the insulating layer CL. Meanwhile, the dielectric layer DL may also be formed by thermally oxidizing the surface of the semiconductor layer SL. In the case of thermal oxidation, the dielectric layer DL is formed over the surface (upper surface and side surfaces) of the first semiconductor layer FS but is not formed over the insulating layer CL.

The second semiconductor layer SS: comprises an n-type polycrystalline Si for example; and, as shown in FIGS. 1 and 3 to 5, integrally has a control section (third part) SSc and peripheral sections (fourth parts) SSp formed adjacently on both the sides of the control section SSc in a width direction (a short direction, a direction intersecting with a propagation direction of light and being parallel with the principal surface of the substrate SB). Here, as shown in FIG. 6, the thickness Hss of the second semiconductor layer SS is about 150 nm for example.

The control section SSc extends in a propagation direction of light (a vertical direction in FIGS. 1 and 3) as shown in FIGS. 1 and 3. Further, the control section SSc is formed so as to cover the upper surface of the rib section FSr and both the side surfaces of the rib section FSr in a width direction as shown in FIGS. 4 and 5. That is, in Patent Literature 2, an n-type semiconductor layer 205 (control section) covers only the upper surface of a rib waveguide 203 as shown in FIG. 46. In First Embodiment in contrast, the control section SSc covers not only the upper surface but also both the side surfaces of the rib section FSr. As a result, an area where the control section SSc and the rib section FSr confront each other can be increased without changing the area of the control section SSc in a plan view. Consequently, a carrier plasma effect larger than Patent Literature 2 can be generated and hence the state of light propagating in the rib section FSr can be changed efficiently (effectively). The power consumption at the optical waveguide section LD therefore can be reduced without increasing the area occupied by the optical waveguide section LD (length of the optical waveguide section LD in a propagation direction of light).

The peripheral sections SSp integrally have a plurality of lead-out sections (sixth parts) SSp1 formed on both the sides of the control section SSc in a width direction and a plurality of coupling sections (eighth parts) SSp2 formed between the lead-out sections SSp1 adjacent in a propagation direction of light.

A plurality of the lead-out sections SSp1 are arranged in a propagation direction of light in a plan view as shown in FIGS. 1 and 3. The lead-out sections SSp1 are desirably arranged so as not to be equally spaced. Otherwise, when the lead-out sections SSp1 are arranged at an equal interval Yd, the interval Yd desirably satisfies the following Expression 2.

$$d \neq m\lambda/2n \qquad \text{(Expression 2)}$$

The interval Yd of the lead-out sections SSp1 may be either equal to or different from the interval Ys of the lead-out sections FSs1 in the first semiconductor layer FS. Further, an electrode (second electrode) E2 is electrically coupled to each of the lead-out sections SSp1 as shown in FIGS. 1, 3, and 5.

Each of the electrodes E2: is an electrode for supplying a prescribed voltage (control voltage) to the second semiconductor layer SS; and is configured by embedding a conductor film into a contact hole (second coupling hole) CNT2 pierced in the insulating film iF. A silicide layer may also be formed over the upper surface of the second semiconductor layer SS (lead-out section SSp1) exposed from the bottom surface of the contact hole CNT2. On this occasion, the silicide layer is also included in the electrode E2. Then the second semiconductor layer SS (lead-out section SSp1) is arranged but the first semiconductor layer FS is not arranged between the electrode E2 and the substrate SB (insulating layer CL). That is, the electrode E2 comes into contact with the lead-out section SSp1, which does not overlap with the first semiconductor layer SS, in the second semiconductor layer SS. In other words, the second semiconductor layer SS comes into contact with and is electrically coupled to the electrode E2 at the lead-out section SSp1 which does not overlap with the first semiconductor layer FS.

Further, the electrodes E2 are electrically coupled to relevant common wires WL2. Each of the common wires WL2 has the pattern of a band extending in a propagation direction of light so as not to overlap with the rib section FSr in a plan view as shown in FIGS. 1 and 5. Here, the electrodes E1 and the electrodes E2 deviate from each other in a direction intersecting with a propagation direction of light and being parallel with the principal surface of the substrate SB in a plan view. That is, a distance between the rib section FSr and the electrodes E2 is larger than a distance between the rib section FSr and the electrodes E1 in a plan view. By deviating the positions of the electrodes E1 and E2 in this way, the wires WL1 and WL2 can be formed so as to have the simple pattern of a band and can be arranged alongside each other. Here, the configurations, materials, and wiring layer positions of the electrodes E2 and the wires WL2 are identical to those of the electrodes E1 and the wires WL1.

Furthermore, as shown in FIGS. 1, 3 and 5, $n^+$-type semiconductor regions (third semiconductor regions) NR1 are formed at parts, with which the electrodes E2 come into contact, of the lead-out sections SSp1. An impurity concentration of the semiconductor regions NR1 is set so as to be higher than an impurity concentration of the control section SSc so that the contact state of the electrodes E2 and the lead-out sections SSp1 may be an ohmic contact state. Here, hatching is applied to the semiconductor regions NR1 in FIGS. 1 and 3 in order to make the drawings easy to see.

The lead-out sections SSp1 in the second semiconductor layer SS are arranged so as not to overlap with the rib section FSr in the first semiconductor layer FS. Further, the lead-out sections SSp1 in the second semiconductor layer SS and the lead-out sections FSs1 in the first semiconductor layer FS deviate from each other in a propagation direction of light so as not to overlap with each other in a plan view. As a result of the configuration, the first semiconductor layer FS and the second semiconductor layer SS do not overlap with each other at the places where the electrodes E1 and E2 are arranged. Consequently, when contact holes CNT2 are formed for forming the electrodes E2 by dry etching, the dielectric layer DL between the first semiconductor layer FS and the second semiconductor layer SS is neither damaged nor broken and hence short-circuit failure between the first semiconductor layer FS and the second semiconductor layer SS can be prevented. The reliability of an optical waveguide section LD therefore can be improved.

<Operation Example of Semiconductor Device>

An operation example of an optical waveguide section LD configuring an optical modulator LM in a semiconductor device according to First Embodiment is explained hereunder in reference to FIGS. 4 and 5.

In First Embodiment, a prescribed control voltage is applied to a second semiconductor layer SS through wires WL2 (electrodes E2) in the state of supplying a reference potential to a first semiconductor layer FS through wires WL1 (electrodes E1). Then free carriers (electron-positive hole pairs) are accumulated, removed, or reversed at both the first semiconductor layer FS and the second semiconductor layer SS on the upper and lower sides of a dielectric layer DL in a thickness direction in response to the value of a bias voltage between the first semiconductor layer FS and the second semiconductor layer SS. As a result, the density of free carriers sensed by an optical signal electric field varies in the first semiconductor layer FS (mainly, a rib section FSr) and hence an effective refractive index of light propagating in the first semiconductor layer FS (mainly, the rib section FSr) varies (a carrier plasma effect). For example, if a free carrier density increases, a plasma frequency increases and hence the refractive index of light in the first semiconductor layer FS lowers. Then if the refractive index in the first semiconductor layer FS varies, the propagation speed of light propagating in the first semiconductor layer FS (mainly, the rib section FSr) varies and hence the wavelength of the light propagating in the first semiconductor layer FS varies. The phase of the light propagating in the first semiconductor layer FS (mainly, the rib section FSr) therefore can be changed. On top of that, in First Embodiment, since a control section SSc in the second semiconductor layer SS is formed so as to cover the upper surface and both the side surfaces of the rib section FSr in the first semiconductor layer FS, a larger carrier plasma effect can be generated. The state of light therefore can be changed more efficiently (effectively) and hence the power consumption at an optical waveguide section LD can be reduced.

<Configuration Example of Optical Modulator>

Figure 7:
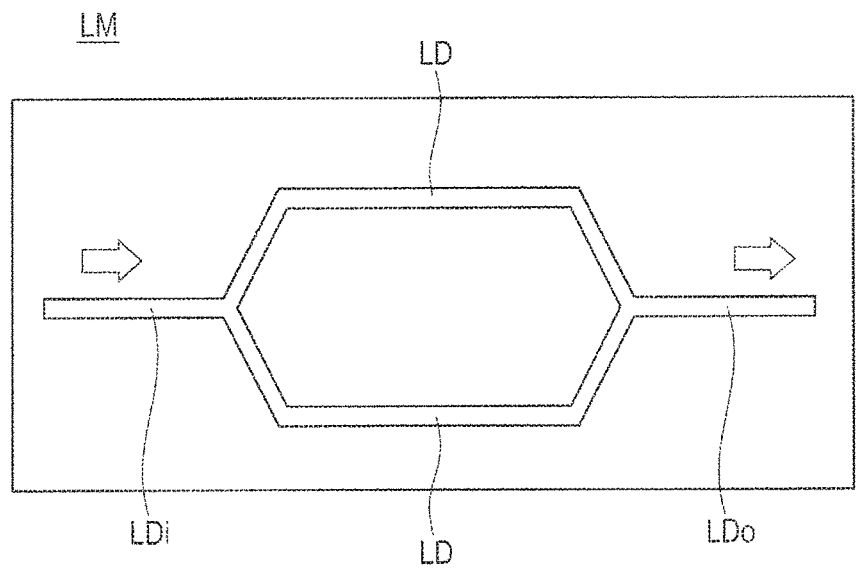
FIG. 7 is a schematic plan view of an optical modulator using the semiconductor device in FIG. 1.

An example of an optical modulator using an optical waveguide section LD configuring a semiconductor device according to First Embodiment is explained hereunder in reference to FIG. 7. FIG. 7 is a schematic plan view of an optical modulator using the semiconductor device in FIG. 1. Here, the arrows in FIG. 7 represent a propagation direction of light.

An optical modulator LM has an optical waveguide section LDi for input, an optical waveguide section LDo for output, and two optical waveguide sections LD and LD optically coupled in parallel between them.

The optical waveguide section LDi for input and the optical waveguide section LDo for output comprise Si optical waveguides. That is, each of the optical waveguide sections LDi and LDo is configured by surrounding an optical waveguide comprising a semiconductor layer SL (refer to FIG. 4 or 5) by an insulating layer CL and an insulating film iF (refer to FIG. 4 or 5). Further, the structures of the optical waveguide sections LD and LD are as stated earlier.

In such an optical modulator LM, light inputted through the optical waveguide section LDi for input is branched into the two optical waveguide sections LD and LD, is given a phase difference at the two optical waveguide sections LD and LD, and then merges at the optical waveguide section LDo for output. Then the amplitude and phase of the light are modulated by the interference of the light at the time of the merge.

According to First Embodiment, the stability and reliability of an optical waveguide section LD can be improved as stated earlier and hence the stability and reliability of an optical modulator LM can also be improved. Further, the power consumption at the optical waveguide section LD can be reduced and hence the power consumption of the optical modulator LM can also be reduced.

<Configuration Example of Opto-Electric Hybrid Device>

Figure 8:
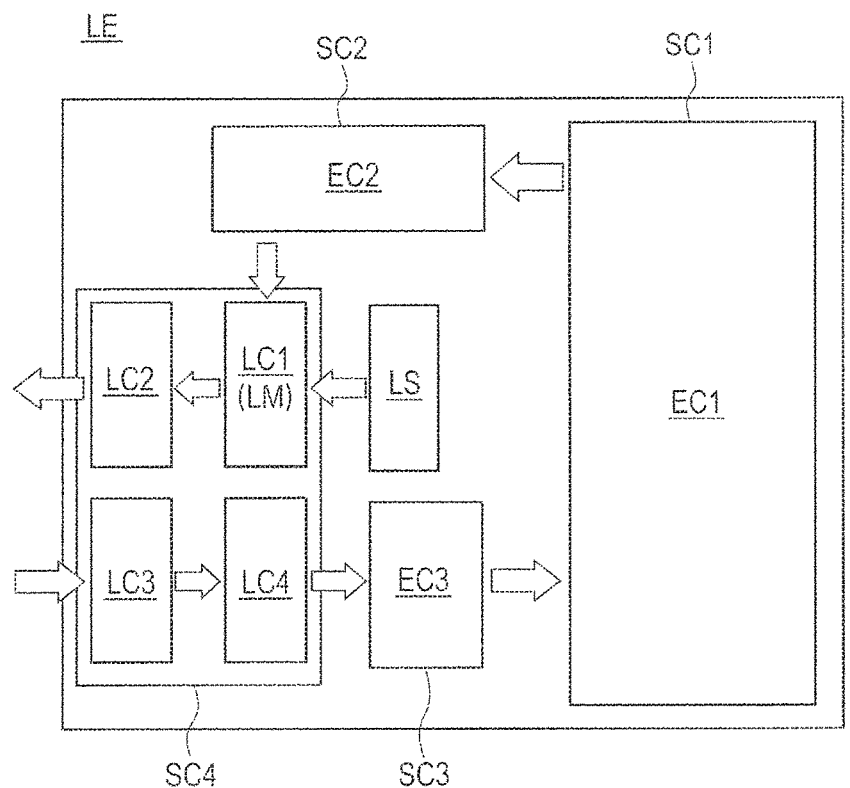
FIG. 8 is a configuration diagram showing an example of an opto-electric hybrid device using the optical modulator in FIG. 7.

An example of an opto-electric hybrid device using the optical modulator LM in FIG. 7 is explained hereunder in reference to FIG. 8. FIG. 8 is a configuration diagram showing an example of an opto-electric hybrid device using the optical modulator in FIG. 7.

An opto-electric hybrid device LE packages four semiconductor chips (merely referred to as chips hereunder) SC1 to SC4 and a light source LS for example.

Electronic circuits EC1, EC2, and EC3 are formed in the chips SC1, SC2, and SC3 respectively and optical circuits LC1 to LC4 are formed in the chip SC4. The light source LS is a laser oscillator to emit laser light of a prescribed wavelength and is optically coupled to the optical circuit LC1 in the chip SC4. That is, continuous wave laser light of a prescribed wavelength emitted from the light source LS enters and is inputted into the optical circuit LC1.

The electronic circuit EC1 in the chip SC1 has a control circuit and a memory circuit and is electrically coupled to the electronic circuit EC2 in the chip SC2. The electronic circuit EC2 comprises a circuit such as a transceiver IC (transceiver integrated circuit) capable of exchanging a bi-directional signal or the like for example and is electrically coupled to the optical circuit LC1 in the chip SC4.

The optical circuit LC1 is an optical circuit to convert an electric signal into an optical signal and comprises an optical modulator LM stated earlier for example. In the optical circuit LC1, the phase of light emitted from the light source LS is modulated on the basis of a control signal (electric signal) sent from the electronic circuit EC1 through the electronic circuit EC2. Here on this occasion, the light source LS is optically coupled to an optical waveguide LDi for input (refer to FIG. 7) in the optical circuit LC1 (optical modulator LM). As a result, the continuous wave laser light emitted from the light source LS enters an optical waveguide LDi for input (refer to FIG. 7) in the optical circuit LC1 (optical modulator LM). Further, the electronic circuit EC2 is electrically coupled to first semiconductor layers FS and second semiconductor layers SS (refer to FIG. 4 or 5) of respective optical waveguide sections LD and LD (refer to FIG. 7) in the optical circuit LC1 (optical modulator LM). As a result, a potential supplied from the electronic circuit EC1 to the optical circuit LC1 through the electronic circuit EC2 is supplied to the first semiconductor layers FS and the second semiconductor layers SS (refer to FIG. 4 or 5) of the respective optical waveguide sections LD and LD (refer to FIG. 7) in the optical circuit LC1.

An output part of the optical circuit LC1 (an optical waveguide LDo for output in the optical modulator LM (refer to FIG. 7)) is optically coupled to the optical circuit LC2 in the identical chip SC4. The optical circuit LC2 is an I/O element (input and output element) such as a grating coupler, a spot size converter, or the like for example. An optical signal sent from the optical circuit LC1 is outputted to the exterior of the opto-electric hybrid device LE through the optical circuit LC2.

The optical circuit LC3 in the chip SC4 is an I/O element such as a grating coupler, a spot size converter, or the like for example and is optically coupled to the optical circuit LC4. An optical signal inputted from the exterior of the opto-electric hybrid device LE is inputted into the optical circuit LC4 through the optical circuit LC3. The optical circuit LC4 is an optical receiver for photoelectric conversion to convert an optical signal sent from the optical circuit LC3 into an electric signal and is electrically coupled to the electronic circuit EC3 in the chip SC3. The electronic circuit EC3 comprises a circuit such as a transceiver IC capable of exchanging a bi-directional signal or the like for example and is electrically coupled to the electronic circuit EC1 in the chip SC1.

According to First Embodiment, the stability and reliability of an optical modulator LM are improved as stated earlier and hence the stability and reliability of an opto-electric hybrid device LE can also be improved. Further, the power consumption of the optical modulator LM can be reduced and hence the power consumption of the opto-electric hybrid device LE can also be reduced.

Further, although the electronic circuits and the optical circuits are formed in different chips respectively in the above explanations, an opto-electric hybrid device LE is not limited to the case and it is also possible to form an electronic circuit and an optical circuit in a single chip. As a result, an opto-electric hybrid device LE can be downsized more. Furthermore, an opto-electric hybrid device LE can be highly integrated and hence the function of the opto-electric hybrid device LE can be improved.

<Manufacturing Method Example of Semiconductor Device>

An example of a manufacturing method of a semiconductor device according to First Embodiment is explained hereunder in reference to FIGS. 9 to 22. Here in FIGS. 9 to 22, figures of odd numbers are plan views showing substantial parts of a semiconductor device according to First Embodiment during manufacturing processes. Further, figures of even numbers show sectional views taken on line I-I in the figures of the odd numbers at the upper stages and sectional views taken on line II-II in the figures of the odd numbers at the lower stages.

Firstly, as shown in FIGS. 9 and 10, a substrate SB is introduced into a manufacturing apparatus of a semiconductor device. The substrate SB is an SOI substrate configured by forming a semiconductor layer SL over a support substrate SSB with an insulating layer CL interposed for example. The insulating layer CL comprises silicon oxide for example and the thickness is set at 1 μm or more for example from the viewpoint of reducing optical loss. The semiconductor layer SL comprises a p-type Si monocrystal for example and the thickness is about 100 to 500 nm for example. Although an SOI substrate in which the conductivity type of a semiconductor layer SL is set at a p-type beforehand is used here, the SOI substrate is not limited to this case and may also be an SIO substrate having an intrinsic semiconductor layer the conductivity type of which is not set. On that occasion for example, after impurities such as boron (B) are introduced into an intrinsic semiconductor layer by an ion implantation method or the like, the conductivity type of the semiconductor layer is set at a p-type by applying heat treatment.

Successively, as shown in FIGS. 11 and 12, a resist mask MA1 for forming a rib section of a first semiconductor layer is formed over the semiconductor layer SL by a lithography method or the like. The resist mask MA1 is formed so as to cover a rib section forming region and expose the other region. Successively, a base of the first semiconductor layer is formed by removing a part (corresponding to a desired depth) of the surface layer of the semiconductor layer SL with the resist mask MA1 used as an etching mask by a dry etching method or the like.

Figure 13:
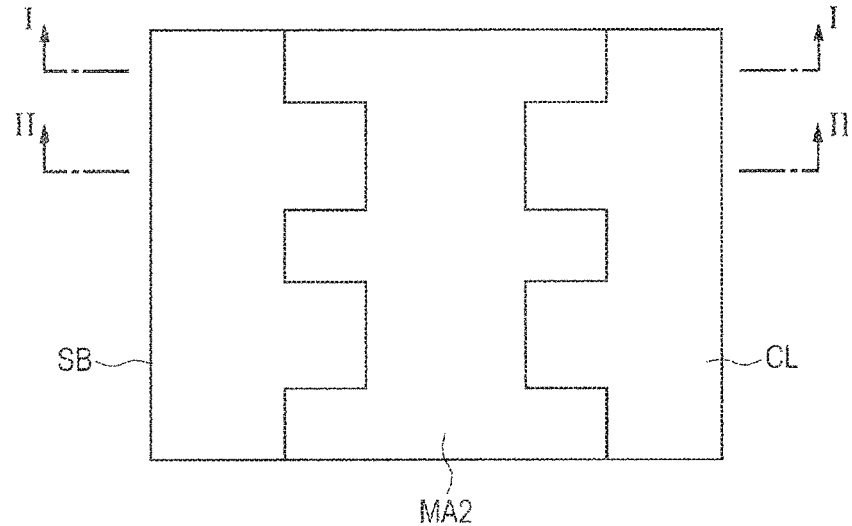
FIG. 13 is a plan view showing a substantial part of the semiconductor device during a manufacturing process after the manufacturing process explained in FIG. 11.
Figure 14:
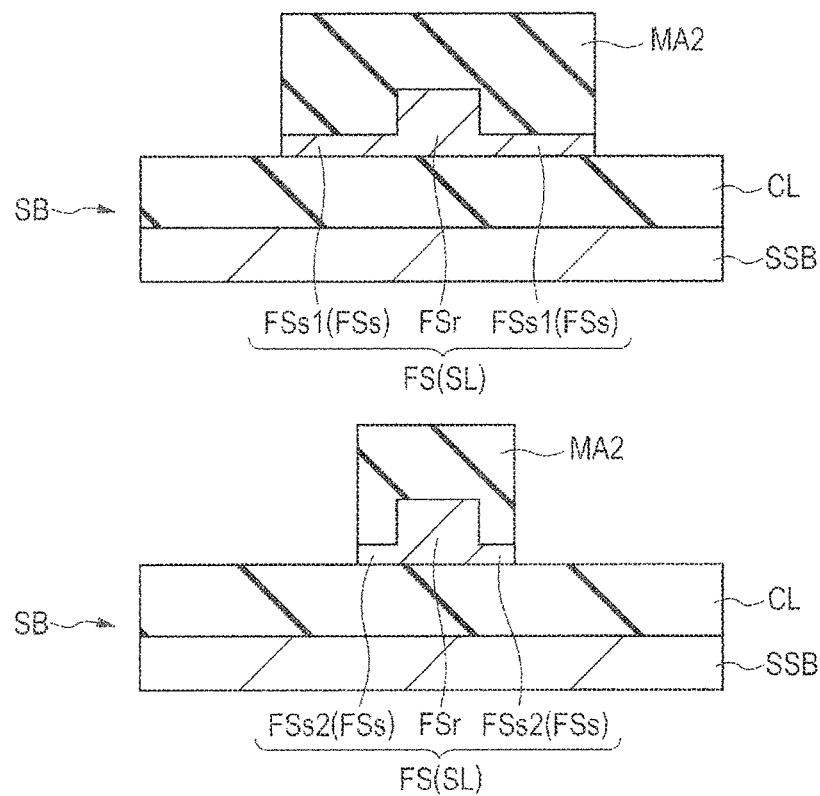
FIG. 14 shows a sectional view taken on line I-I in FIG. 13 at the upper stage and a sectional view taken on line II-II in FIG. 13 at the lower stage.

Successively, after the resist mask MA1 is removed, as shown in FIGS. 13 and 14, a resist mask MA2 for forming the first semiconductor layer is formed over the semiconductor layer SL by a lithography method or the like. The resist mask MA2 is formed so as to cover a region for forming the first semiconductor layer and expose the other region. Successively, a first semiconductor layer FS of a convex shape in a sectional view is formed by removing a part of the remaining semiconductor layer SL with the resist mask MA2 used as an etching mask by a dry etching method or the like. The first semiconductor layer FS integrally has a rib section FSr and slab sections FSs on both the sides of the rib section FSr in a width direction. Each of the slab sections FSs integrally has a plurality of lead-out sections FSs1 and coupling sections FSs2 formed so as to couple two lead-out sections FSs adjacent to each other in the lead-out sections FSs.

Figure 15:
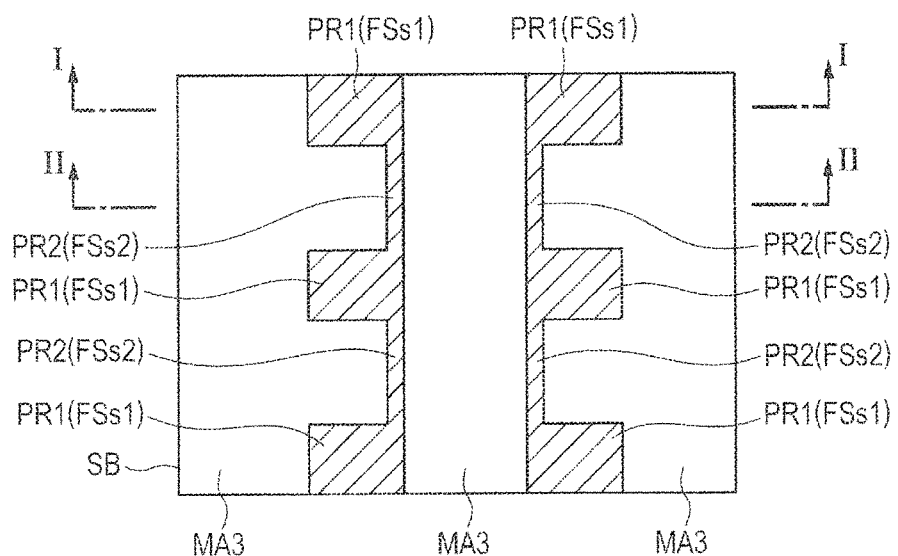
FIG. 15 is a plan view showing a substantial part of the semiconductor device during a manufacturing process after the manufacturing process explained in FIG. 13.
Figure 16:
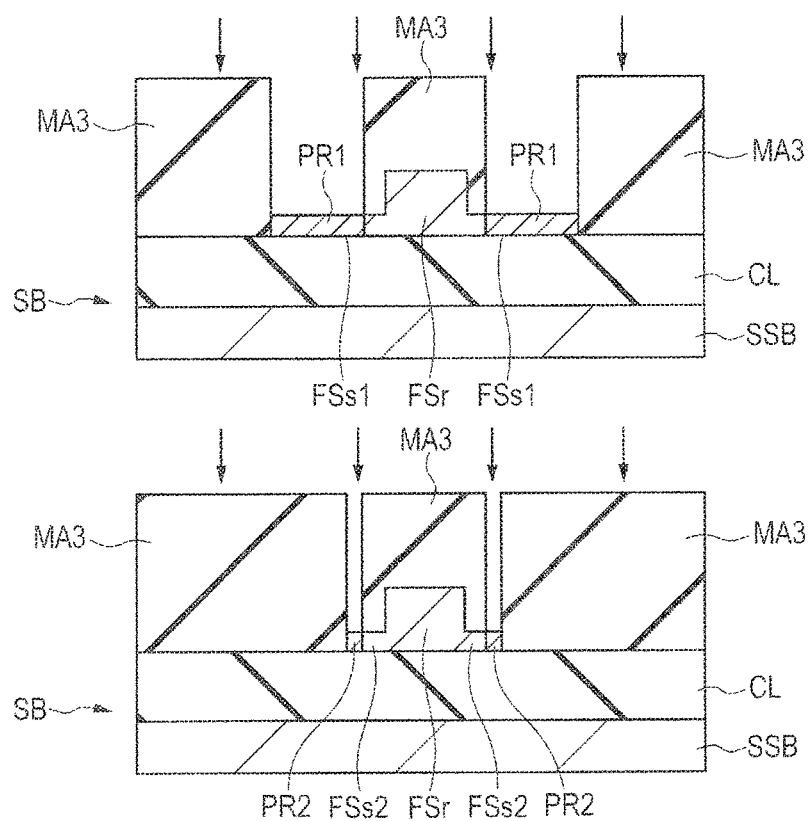
FIG. 16 shows a sectional view taken on line I-I in FIG. 15 at the upper stage and a sectional view taken on line II-II in FIG. 15 at the lower stage.

Successively, after the resist mask MA2 is removed, as shown in FIGS. 15 and 16, a resist mask MA3 for forming a p-type semiconductor region is formed over the substrate SB by a lithography method or the like. The resist mask MA3 is formed so as to expose parts of the slab sections FSs in the first semiconductor layer FS and cover the other parts. Successively, p$^+$-type semiconductor regions PR1 and PR2 are formed integrally at parts of the slab sections FSs in the first semiconductor layer FS by implanting ions of impurities such as B and the like into the first semiconductor layer FS for example with the resist mask MA3 used as an ion implantation mask.

Figure 17:
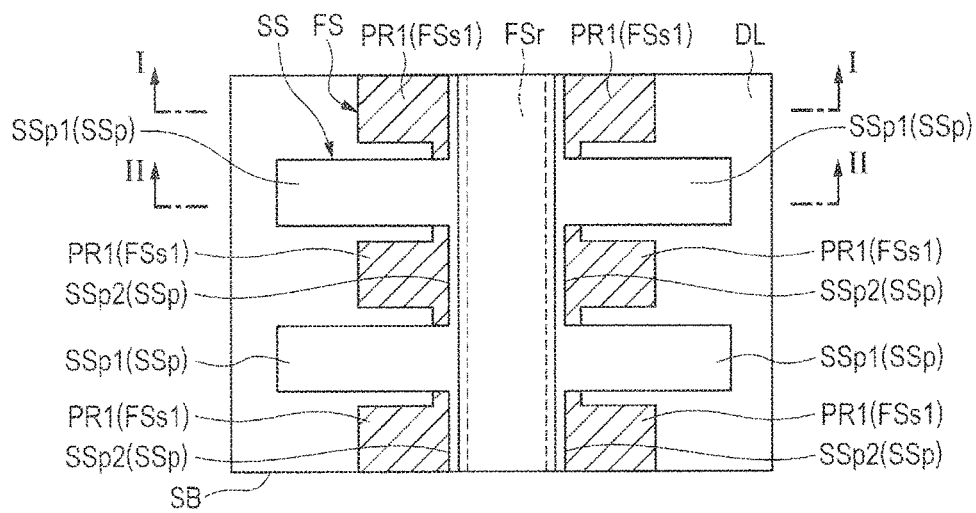
FIG. 17 is a plan view showing a substantial part of the semiconductor device during a manufacturing process after the manufacturing process explained in FIG. 15.
Figure 18:
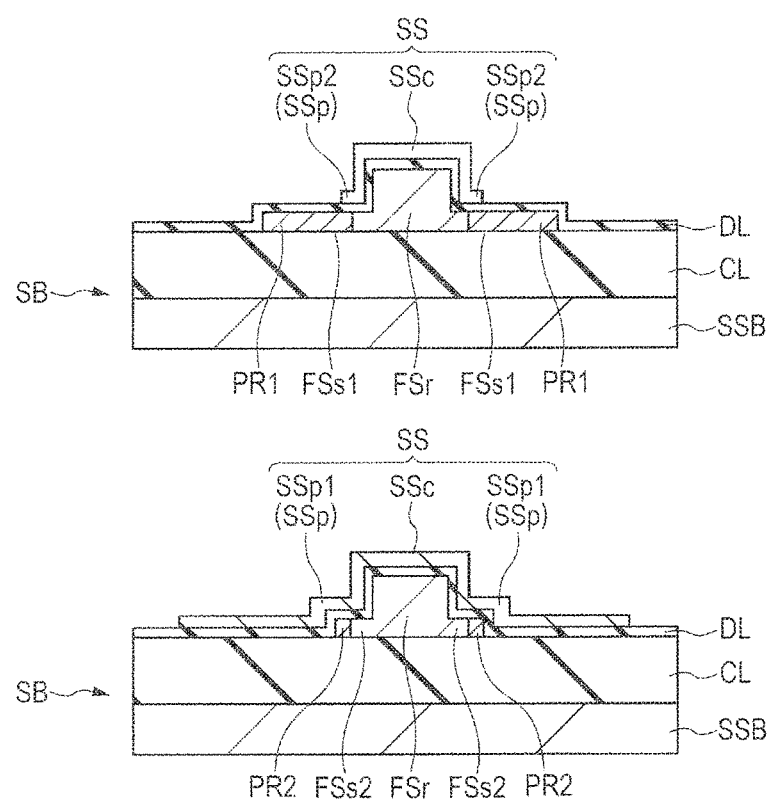
FIG. 18 shows a sectional view taken on line I-I in FIG. 17 at the upper stage and a sectional view taken on line II-II in FIG. 17 at the lower stage.

Successively, after the resist mask MA3 is removed, as shown in FIGS. 17 and 18, a dielectric layer DL is formed over the principal surface of the substrate SB so as to cover the first semiconductor layer FS by a CVD method or the like. The dielectric layer DL comprises silicon oxide for example and the thickness is about 10 nm for example. Otherwise, the dielectric layer DL may also be formed by a thermal oxidation method. On this occasion, the dielectric layer DL is formed only over the surface (upper surface and side surfaces) of the first semiconductor layer FS but is not formed over the insulating layer CL. Successively, a second semiconductor layer SS is formed by depositing a semiconductor layer comprising n-type polycrystalline Si having a thickness of about 150 nm for example over the dielectric layer DL by a CVD method or the like and then patterning the semiconductor layer by a lithography method, a dry etching method, and the like as stated earlier. The second semiconductor layer SS integrally has a control section SSc and peripheral sections SSp on both the sides in a width direction. Each of the peripheral sections SSp integrally has a plurality of lead-out sections SSp1 and coupling sections SSp2 formed so as to couple two lead-out sections SSp1 adjacent to each other in the lead-out sections SSp1.

Figure 19:
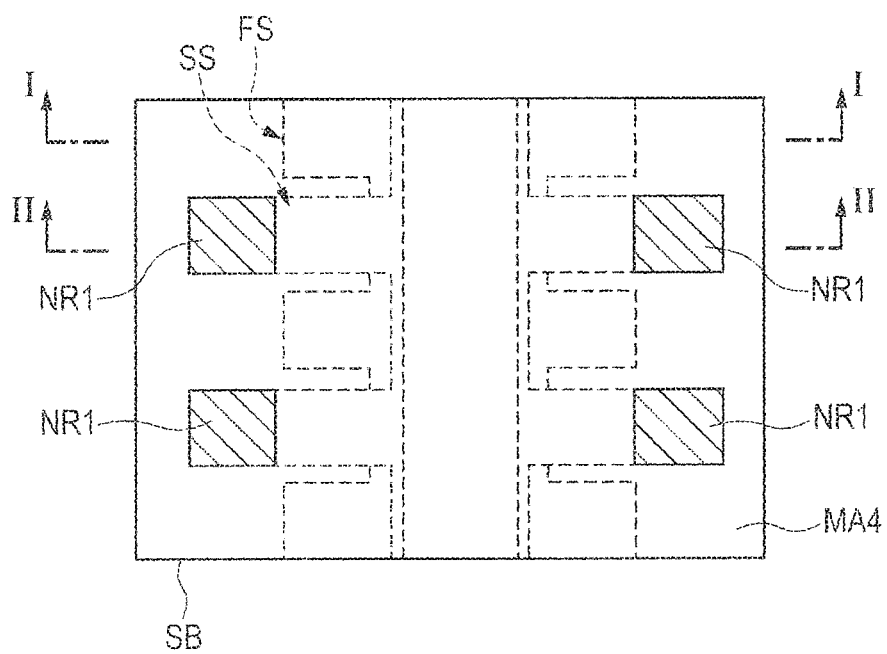
FIG. 19 is a plan view showing a substantial part of the semiconductor device during a manufacturing process after the manufacturing process explained in FIG. 17.

Successively, after a resist mask (not shown in the figures) for forming the second semiconductor layer is removed, as shown in FIGS. 19 and 20, a resist mask MA4 for forming n-type semiconductor regions is formed over the substrate SB by a lithography method or the like. The resist mask MA4 is formed so as to expose parts of the lead-out sections SSp1 in the second semiconductor layer SS and cover the other parts. Successively, $n^+$-type semiconductor regions NR1 are formed at parts of the lead-out sections SSp1 in the second semiconductor layer SS by implanting ions of impurities such as phosphorus (P), arsenic (As), or the like for example to the lead-out sections SSp1 in the second semiconductor layer SS with the resist mask MA4 used as an ion implantation mask.

Figure 22:
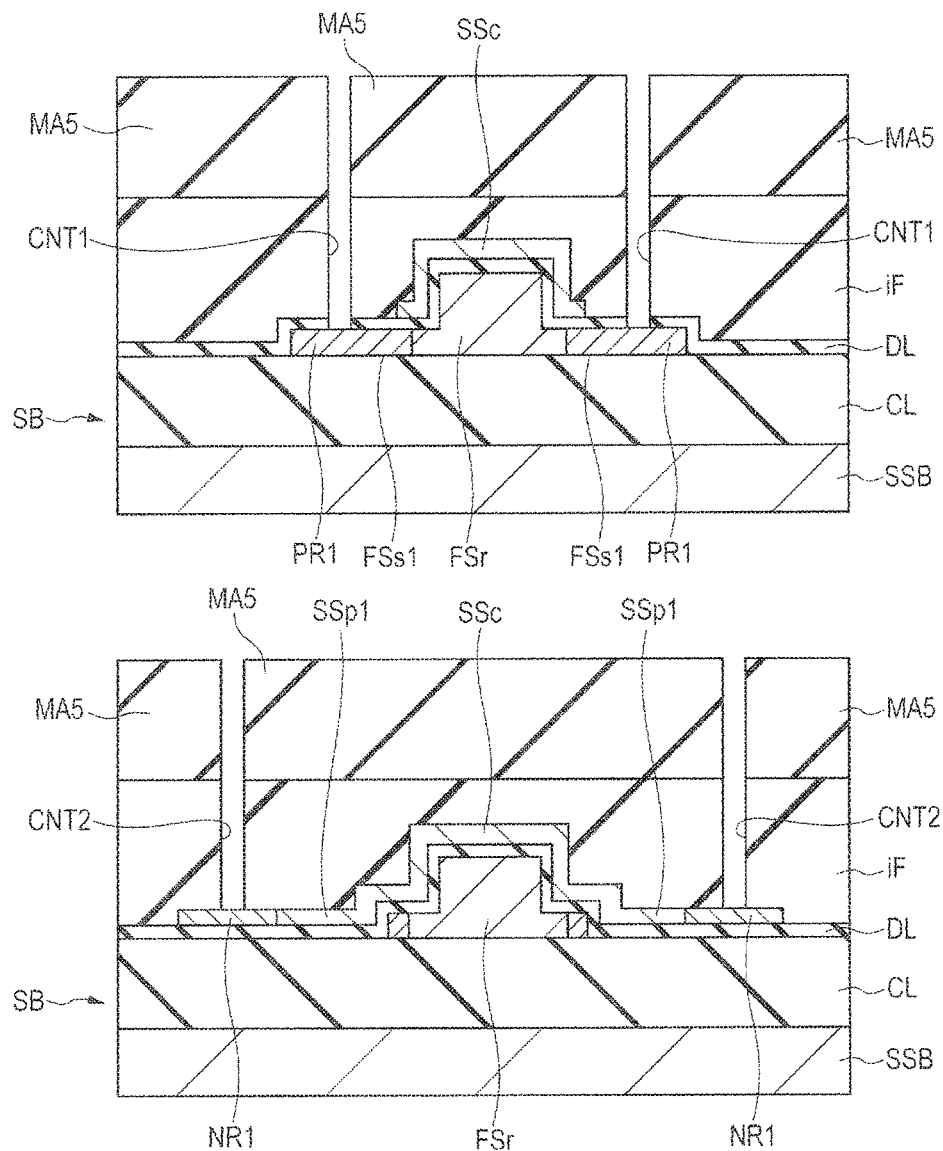
FIG. 22 shows a sectional view taken on line I-I in FIG. 21 at the upper stage and a sectional view taken on line II-II in FIG. 21 at the lower stage.

Successively, after the resist mask MA4 is removed, as shown in FIGS. 21 and 22, an insulating film iF (refer to FIG. 22) for forming a clad section is deposited over the substrate SB by a CVD method or the like. The insulating film iF comprises silicon oxide for example and the thickness is 1 μm or more for example or specifically about 2 to 5 μm for example.

Successively, after a resist mask MA5 for forming contact holes is formed over the insulating film iF by a lithography method or the like, contact holes CNT1 and CNT2 to expose parts of the $p^+$-type semiconductor regions PR1 in the first semiconductor layer FS and the $n^+$-type semiconductor regions NR1 in the second semiconductor layer SS are formed in the insulating film iF by a plasma dry etching method or the like with the resist mask MA5 used as an etching mask.

On this occasion, in First Embodiment, the first semiconductor layer FS and the second semiconductor layer SS are not overlaid with each other at places where the contact holes CNT1 and CNT2 are formed. Consequently, when the contact holes CNT1 and CNT2 are formed by a dry etching treatment, failure of damaging or breaking the dielectric layer DL between the first semiconductor layer FS and the second semiconductor layer SS by charge-up or the like can be avoided. Meanwhile, although the dielectric layer DL exists over the first semiconductor layer FS under the contact holes CNT1, since the second semiconductor layer does not overlap with the first semiconductor layer FS there, even when the dielectric layer DL is damaged or broken by charge-up or the like, the first semiconductor layer FS and the second semiconductor layer SS do not lead to short-circuit failure. Further, although the dielectric layer DL exists also under the second semiconductor layer SS under the contact holes CNT2, since the first semiconductor layer FS does not exist under the second semiconductor layer SS there, the first semiconductor layer FS and the second semiconductor layer SS do not lead to short-circuit failure.

Successively, after the resist mask MA5 is removed, for example, Ti/TiN/Al (or Cu or W) is deposited over the substrate SB in this order from the bottom layer by a sputtering method, a CVD method, or the like and then the deposited layer is patterned with a resist mask used as an etching mask similarly to the above case by a reactive etching method or the like. As a result, electrodes E1 and E2 and wires WL1 and WL2 are formed as shown in FIGS. 1, 4, and 5.

In First Embodiment in this way, since short-circuit failure between a first semiconductor layer FS and a second semiconductor layer SS, those configuring an optical waveguide section LD, can be prevented, the reliability of the optical waveguide section PD can be improved. Further, when an optical waveguide section LD is manufactured, a specific manufacturing process is not added and hence nether the manufacturing processes of a semiconductor device increase nor the manufacturing of an optical waveguide section LD comes to be difficult.

First Modified Example of First Embodiment

Figure 23:
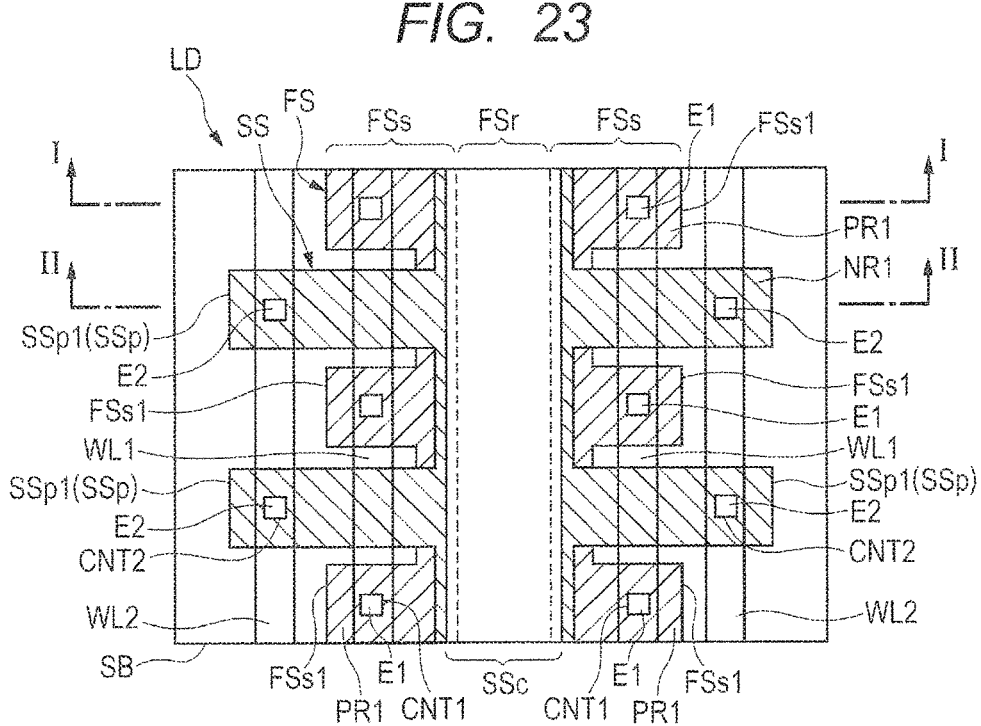
FIG. 23 is a plan view showing a substantial part of a semiconductor device according to First Modified Example of First Embodiment.
Figure 24:
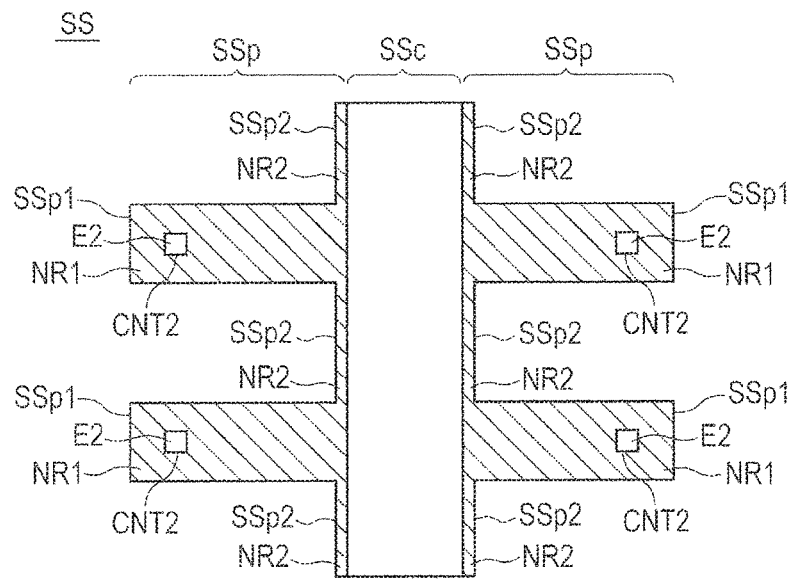
FIG. 24 is a plan view showing a substantial part of a second semiconductor layer configuring the semiconductor device in FIG. 23.
Figure 25:
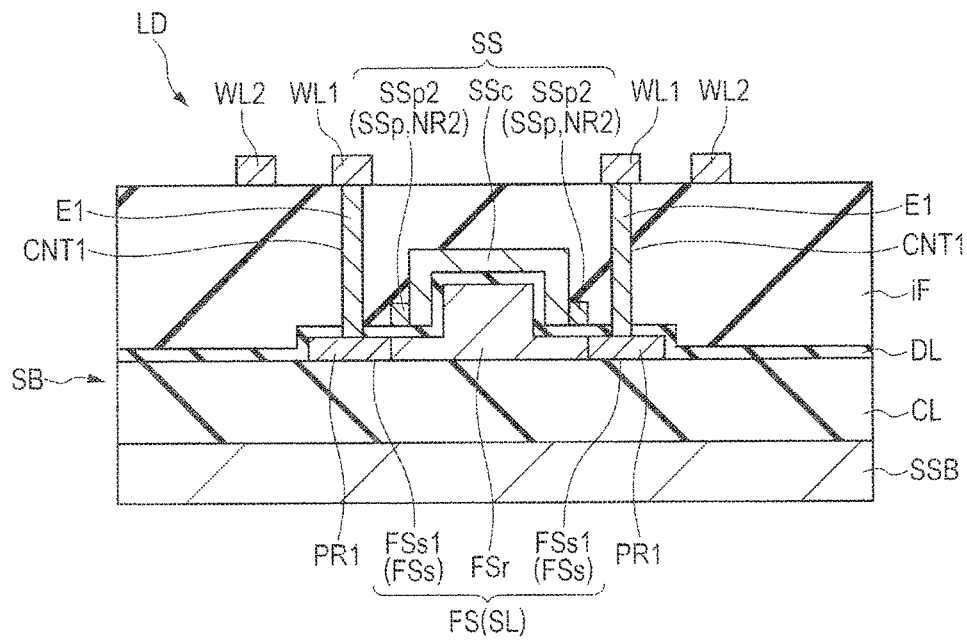
FIG. 25 is a sectional view taken on line I-I in FIG. 23.
Figure 26:
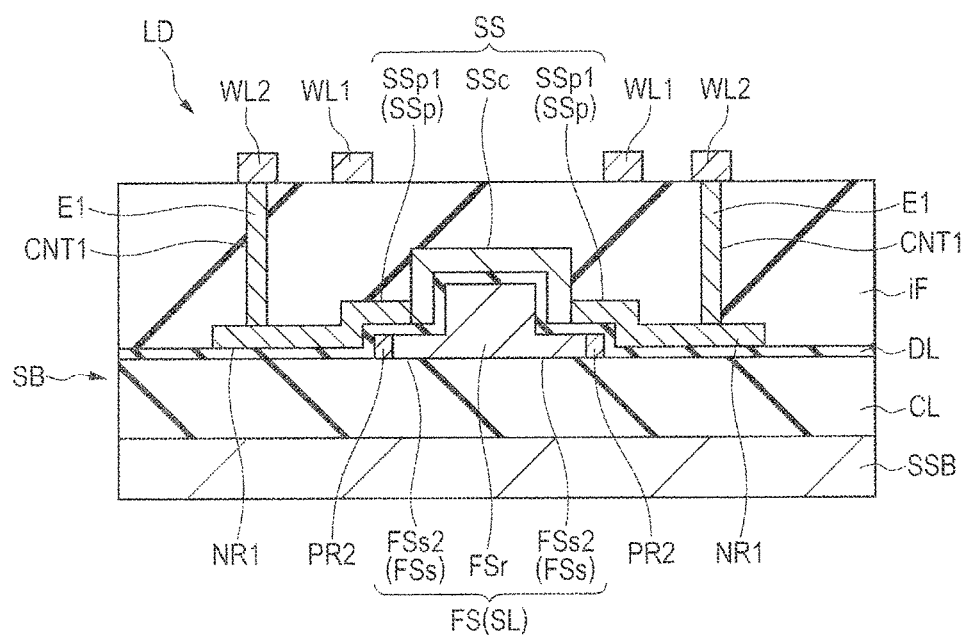
FIG. 26 is a sectional view taken on line II-II in FIG. 23.

FIG. 23 is a plan view showing a substantial part of a semiconductor device according to First Modified Example of First Embodiment, FIG. 24 is a plan view showing a substantial part of a second semiconductor layer configuring the semiconductor device in FIG. 23, FIG. 25 is a sectional view taken on line I-I in FIG. 23, and FIG. 26 is a sectional view taken on line II-II in FIG. 23. Here, a plan view showing a substantial part of a first semiconductor layer FS is the same as FIG. 2 and hence is omitted.

In First Modified Example, as shown in FIGS. 23 and 24, $n^+$-type semiconductor regions NR1 are formed in all the regions of a plurality of lead-out sections SSp1 in a second semiconductor layer FS. Further, $n^+$-type semiconductor regions (fourth semiconductor regions) NR2 are formed also at coupling sections SSp2 formed so as to couple two lead-out sections SSp1 adjacent to each other in the lead-out sections SSp1. The $n^+$-type semiconductor regions NR2 are formed integrally with the $n^+$-type semiconductor regions NR1 of the lead-out sections SSp1. That is, the $n^+$-type semiconductor regions NR1 in the lead-out sections SSp1 are electrically coupled to each other with the $n^+$-type semiconductor regions NR2 of the coupling sections SSp2 interposed. Consequently, resistance between the lead-out sections SSp1 can be reduced. As a result, a control voltage can be supplied efficiently to the second semiconductor layer SS and hence the power consumption at an optical waveguide section LD can be reduced yet further. Further, a control voltage can be supplied stably to the wide range of the second semiconductor layer SS and hence the operational stability of an optical waveguide section LD can be improved yet further.

In order to form $n^+$-type semiconductor regions NR2 in coupling sections SSp2, the $n^+$-type semiconductor regions NR2 may be formed simultaneously with a step for forming n+-type semiconductor regions NR1 explained in FIGS. 19 and 20. P or As is introduced into the n+-type semiconductor regions NR2 for example. Here, in FIGS. 23 and 24, hatching is applied to the semiconductor regions PR1, PR2, NR1, and NR2 in order to make the drawings easy to see. Other configurations, manufacturing methods, and effects are identical to those in First Embodiment stated earlier.

Second Modified Example of First Embodiment

Figure 27:
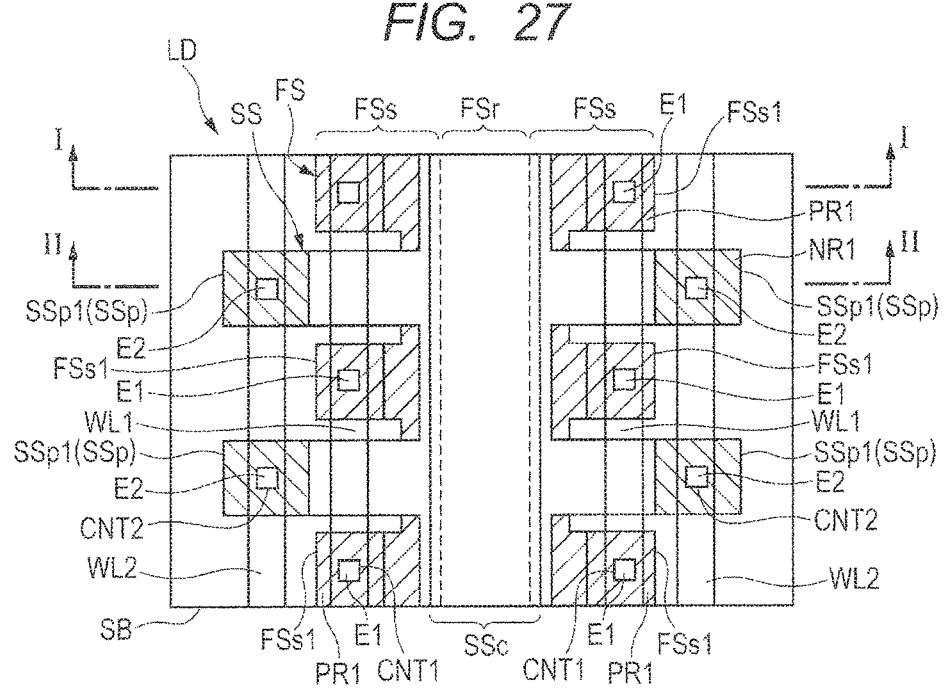
FIG. 27 is a plan view showing a substantial part of a semiconductor device according to Second Modified Example of First Embodiment.
Figure 28:
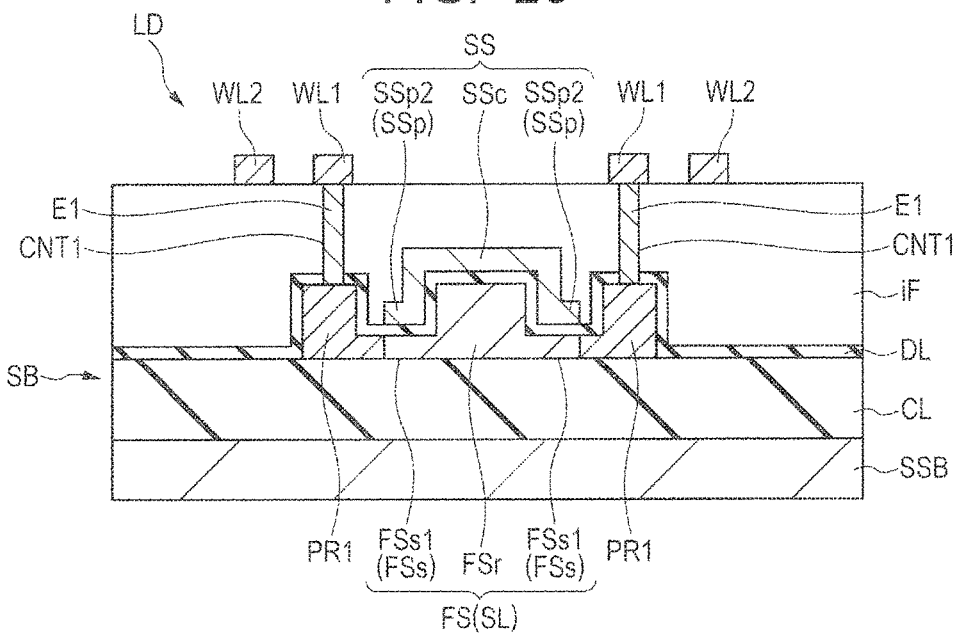
FIG. 28 is a sectional view taken on line I-I in FIG. 27.

FIG. 27 is a plan view showing a substantial part of a semiconductor device according to Second Modified Example of First Embodiment and FIG. 28 is a sectional view taken on line I-I in FIG. 27. Here, a sectional view taken on line II-II in FIG. 27 is identical to FIG. 5 and hence is omitted.

In Second Modified Example, the height of the upper surfaces of outer edges of lead-out sections FSs1 configuring slab sections FSs in a first semiconductor layer FS is larger than the height of the upper surface of other parts (coupling sections FSs2 and others) of the slab sections FSs. That is, the thickness of the outer edges of the lead-out sections FSs1 of the slab sections FSs is larger than the thickness of the other parts (coupling sections FSs2 and others) of the slab sections FSs.

The height of the upper surfaces of the outer edges of the lead-out sections FSs1 is nearly identical to the height of the upper surface of a rib section FSr. That is, the thickness of the outer edges of the lead-out sections FSs1 is nearly identical to the thickness of the rib section FSr. In other words, recesses are formed between the rib section FSr and the outer edges of the lead-out sections FSs1 of the slab sections FSs in the first semiconductor layer FS as shown in FIG. 28.

In order to form such a configuration, during the etching step of a semiconductor layer SL explained in FIGS. 11 and 12, a resist mask MA1 may be formed also over parts of the semiconductor layer SL corresponding to the outer edges of lead-out sections FSs1 in slab sections FSs similarly to a rib section FSr and the parts of the semiconductor layer SL may remain thick.

According to Second Modified Example, since contact holes CNT1 can be shallow, a silicide layer can be formed in a stable state when the silicide layer is formed over the bottom surfaces of the contact holes CNT1. Consequently, contact resistance between electrodes E1 and semiconductor regions PR1 in a first semiconductor layer FS can be reduced. A reference potential therefore can be supplied efficiently to the first semiconductor layer FS and hence the power consumption at an optical waveguide section LD can be reduced yet further. Other configurations, manufacturing methods, and effects are identical to those in First Embodiment stated earlier.

Third Modified Example of First Embodiment

Figure 29:
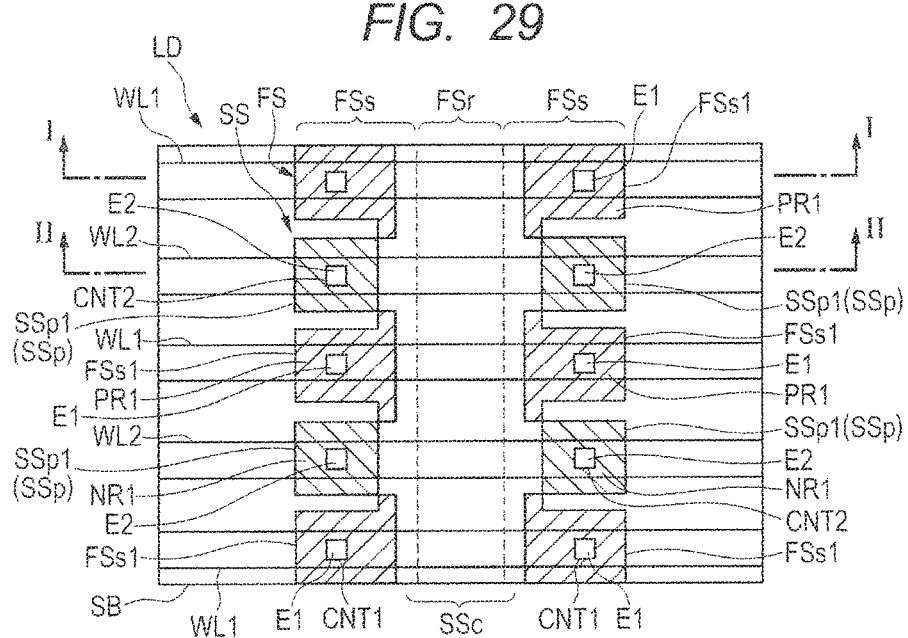
FIG. 29 is a plan view showing a substantial part of a semiconductor device according to Third Modified Example of First Embodiment.
Figure 30:
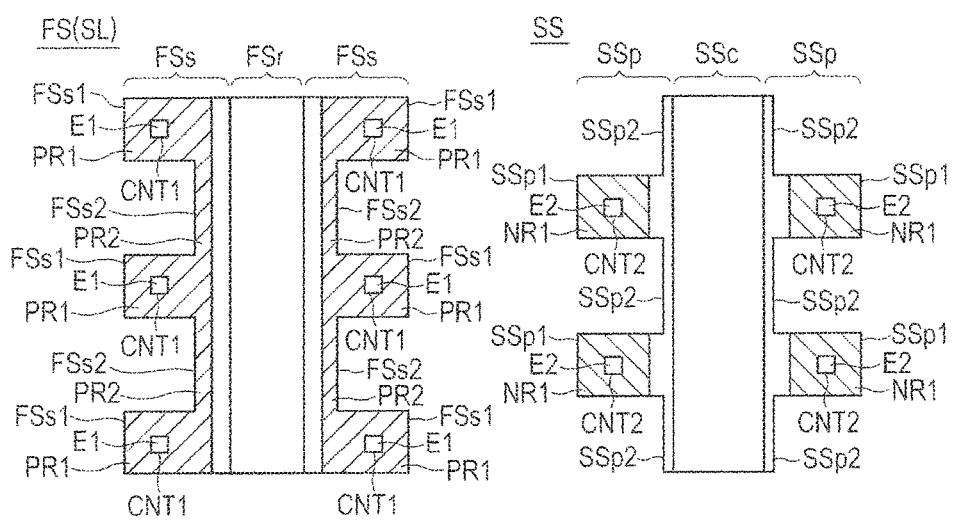
FIG. 30 comprises a plan view showing a substantial part of a first semiconductor layer configuring the semiconductor device in FIG. 29 on the left side and a plan view showing a substantial part of a second semiconductor layer configuring the semiconductor device in FIG. 29 on the right side.
Figure 31:
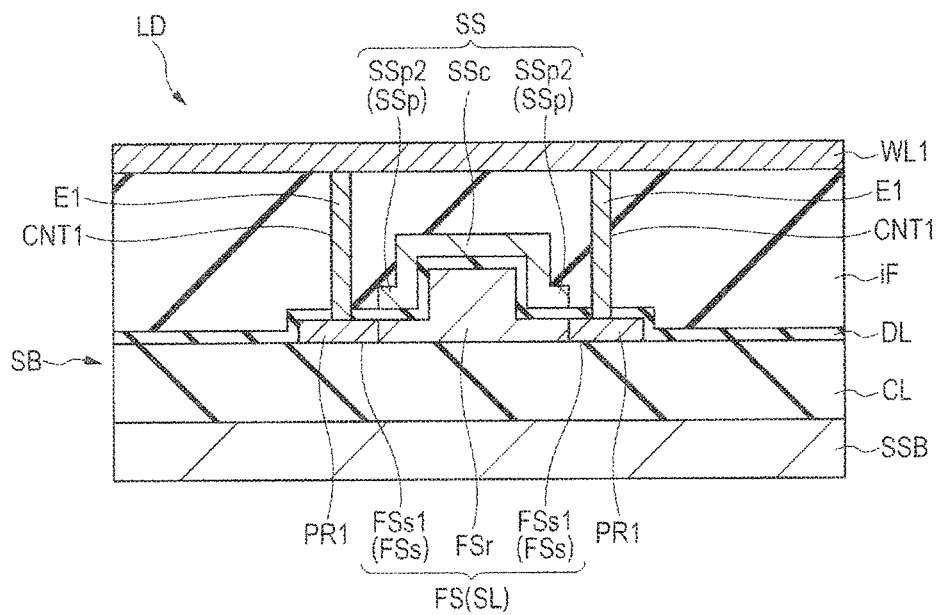
FIG. 31 is a sectional view taken on line I-I in FIG. 29.
Figure 32:
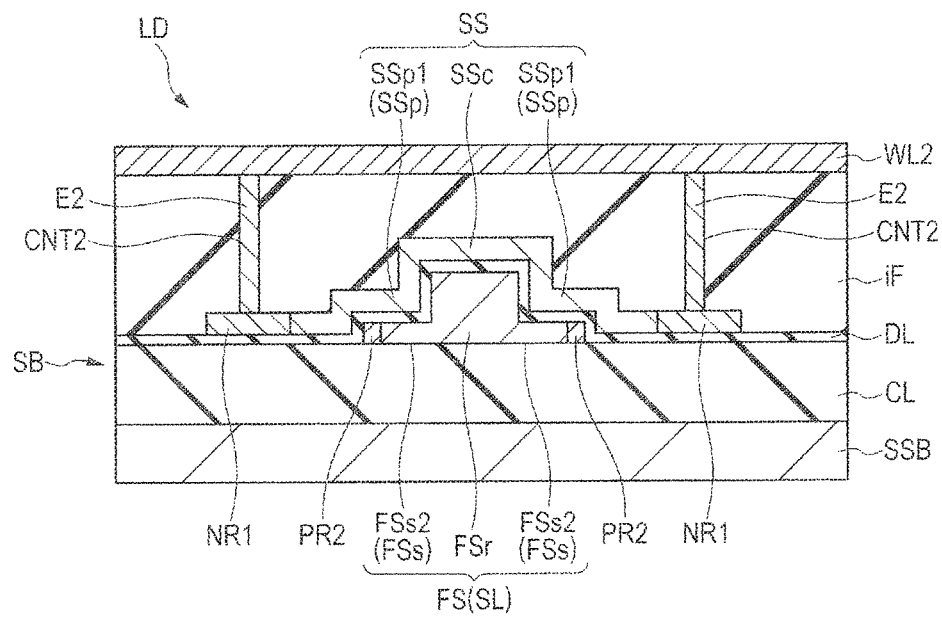
FIG. 32 is a sectional view taken on line II-II in FIG. 29.

FIG. 29 is a plan view showing a substantial part of a semiconductor device according to Third Modified Example of First Embodiment, FIG. 30 comprises a plan view showing a substantial part of a first semiconductor layer configuring the semiconductor device in FIG. 29 on the left side and a plan view showing a substantial part of a second semiconductor layer configuring the semiconductor device in FIG. 29 on the right side, FIG. 31 is a sectional view taken on line I-I in FIG. 29, and FIG. 32 is a sectional view taken on line II-II in FIG. 29.

In Third Modified Example, as shown in FIG. 29, the positions of electrodes E1 and E2 are nearly identical on both the sides of a rib section FSr in a width direction. That is, a distance from the rib section FSr to the electrodes E1 and a distance from the rib section FSr to the electrodes E2 are nearly identical. On this occasion, a distance (protrusion length) from the rib section FSr to outer edges of lead-out sections FSs1 in a first semiconductor layer FS is nearly identical to a distance (protrusion length) from the rib section FSr to outer edges of lead-out sections SSp1 in a second semiconductor layer SS. On this occasion further, as shown in FIGS. 29, 31, and 32, wires WL1 and WL2 are arranged so as to intersect with (perpendicular to) a propagation direction of light (namely, the rib section FSr) and be parallel with the principal surface of a substrate SB. Here, the plan view of the first semiconductor layer FS shown on the left side in FIG. 30 is identical to FIG. 2. Further, the plan view of the second semiconductor layer SS shown on the right side in FIG. 30 is identical to FIG. 3 except that a protrusion length of the lead-out sections SSp1 is smaller than a protrusion length of the lead-out sections SSp1 in the second semiconductor layer SS in FIG. 3. Here, the configurations, positions of wiring layers, and materials of the wires WL1 and WL2 are identical to those in First Embodiment stated earlier.

According to Third Modified Example, a protrusion length of lead-out sections SSp1 in a second semiconductor layer SS is nearly identical to a protrusion length of lead-out sections FSs1 of slab sections FSs in a first semiconductor layer FS and hence an area occupied by an optical waveguide section PD can be reduced. Further, a distance from lead-out sections SSp1 to a control section SSc in a second semiconductor layer SS can be reduced and hence the resistance between them can be reduced further than First Embodiment stated earlier. A control voltage therefore can be supplied to the second semiconductor layer SS efficiently and hence the power consumption at an optical waveguide section LD can be reduced yet further. Further, a control voltage can be supplied to the wide range of the second semiconductor layer SS stably and hence the operational stability of the optical waveguide section LD can be improved yet further. Other configurations and effects are identical to those in First Embodiment stated earlier.

Fourth Modified Example of First Embodiment

Figure 33:
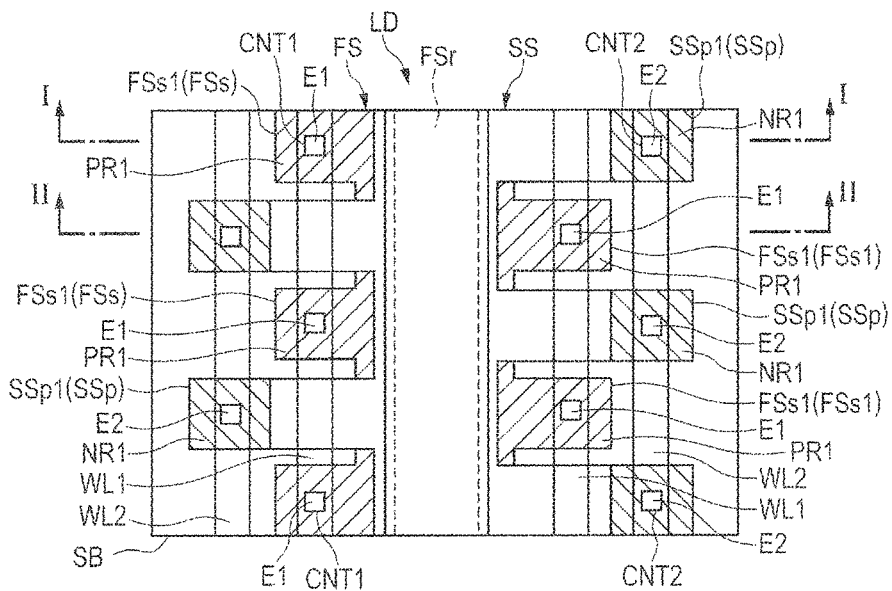
FIG. 33 is a plan view showing a substantial part of a semiconductor device according to Fourth Modified Example of First Embodiment.
Figure 34:
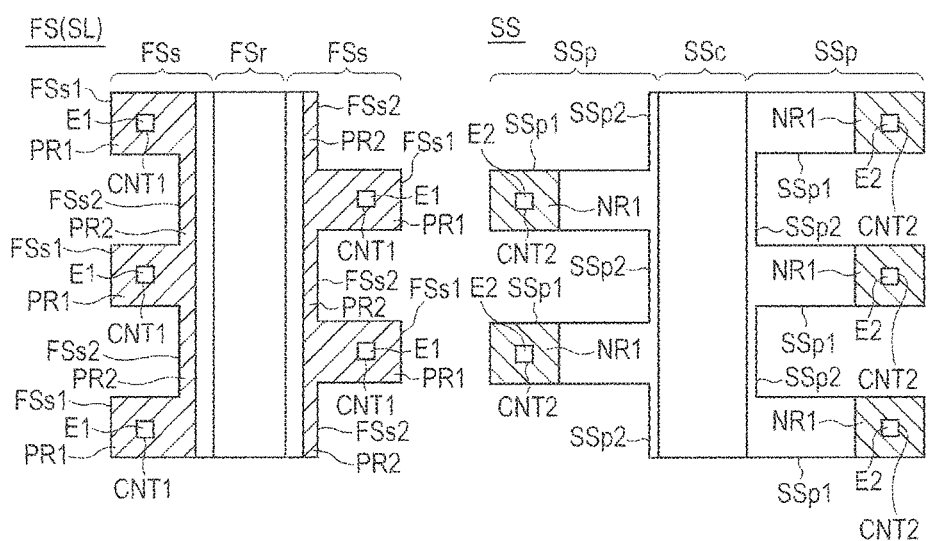
FIG. 34 comprises a plan view showing a substantial part of a first semiconductor layer configuring the semiconductor device in FIG. 33 on the left side and a plan view showing a substantial part of a second semiconductor layer configuring the semiconductor device in FIG. 33 on the right side.
Figure 35:
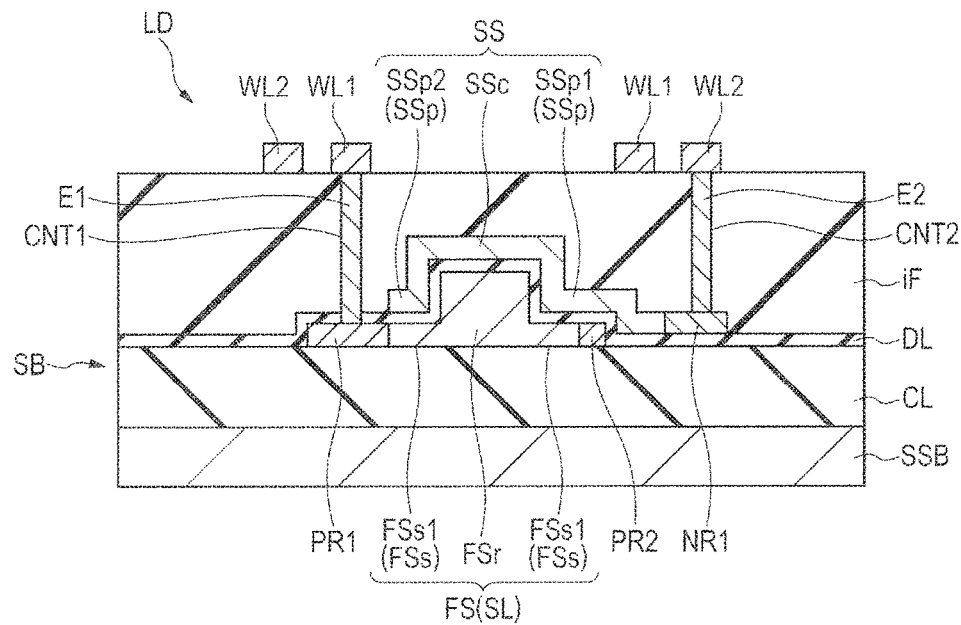
FIG. 35 is a sectional view taken on line I-I in FIG. 33.
Figure 36:
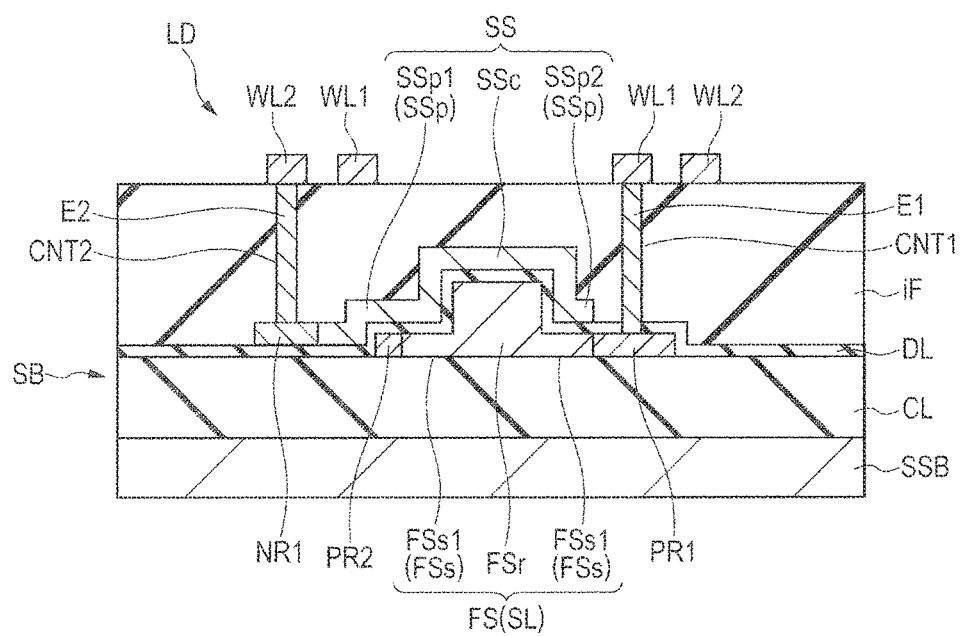
FIG. 36 is a sectional view taken on line II-II in FIG. 33.

FIG. 33 is a plan view showing a substantial part of a semiconductor device according to Fourth Modified Example of First Embodiment, FIG. 34 comprises a plan view showing a substantial part of a first semiconductor layer configuring the semiconductor device in FIG. 33 on the left side and a plan view showing a substantial part of a second semiconductor layer configuring the semiconductor device in FIG. 33 on the right side, FIG. 35 is a sectional view taken on line I-I in FIG. 33, and FIG. 36 is a sectional view taken on line II-II in FIG. 33.

In Fourth Modified Example, lead-out sections FSs1 and FSs1 on the respective sides of a rib section FSr in a width direction are arranged zigzag in a first semiconductor layer FS. That is, the positions of the lead-out sections FSs1 and FSs1 on the respective sides in a width direction deviate in a propagation direction of light in the first semiconductor layer Fs. In other words, in a plan view, the lead-out sections FSs1 arranged adjacently on one side of the rib section FSr and the lead-out sections FSs1 arranged adjacently on the other side of the rib section FSr are arranged so as not to confront each other with the rib section FSr interposed.

Further, lead-out sections SSp1 and SSp1 on the respective sides of a control section SSC in a width direction are also arranged zigzag in a second semiconductor layer SS. That is, the positions of the lead-out sections SSp1 and SSp1 on the respective sides in a width direction deviate in a propagation direction of light in the second semiconductor layer SS. In other words, in a plan view, the lead-out sections FSp1 arranged adjacently on one side of the control section SSc and the lead-out sections FSp1 arranged adjacently on the other side of the control section SSc are arranged so as not to confront each other with the control section SSc interposed.

According to Fourth Modified Example, the state of potentials supplied to a first semiconductor layer FS and a second semiconductor layer SS can be better. Potentials therefore can be supplied to the first semiconductor layer FS and the second semiconductor layer SS more efficiently and hence the power consumption at an optical waveguide section LD can be reduced yet further. Further, the operational stability of the optical waveguide section LD can be improved yet further. Other configurations, manufacturing methods, and effects are identical to those in First Embodiment stated earlier.

Second Embodiment

Figure 37:
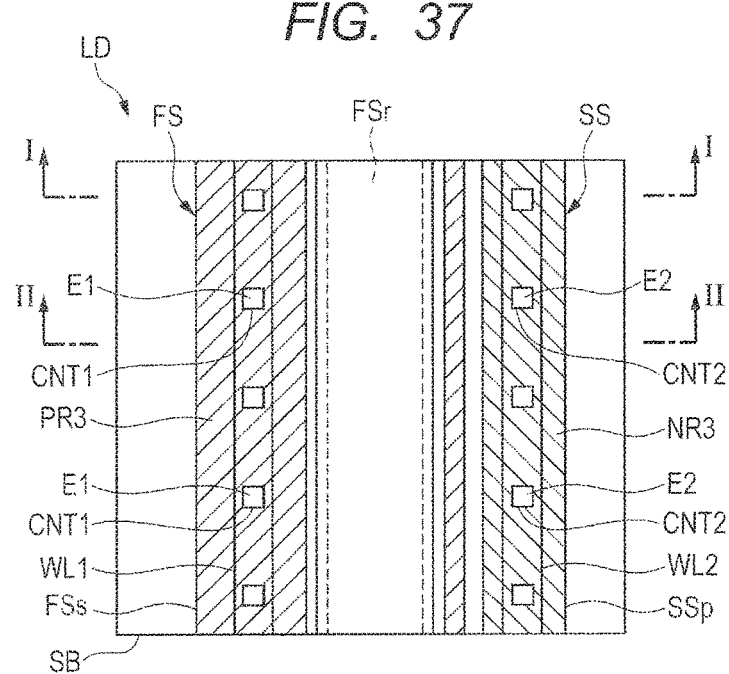
FIG. 37 is a plan view showing a substantial part of a semiconductor device according to Second Embodiment.
Figure 38:
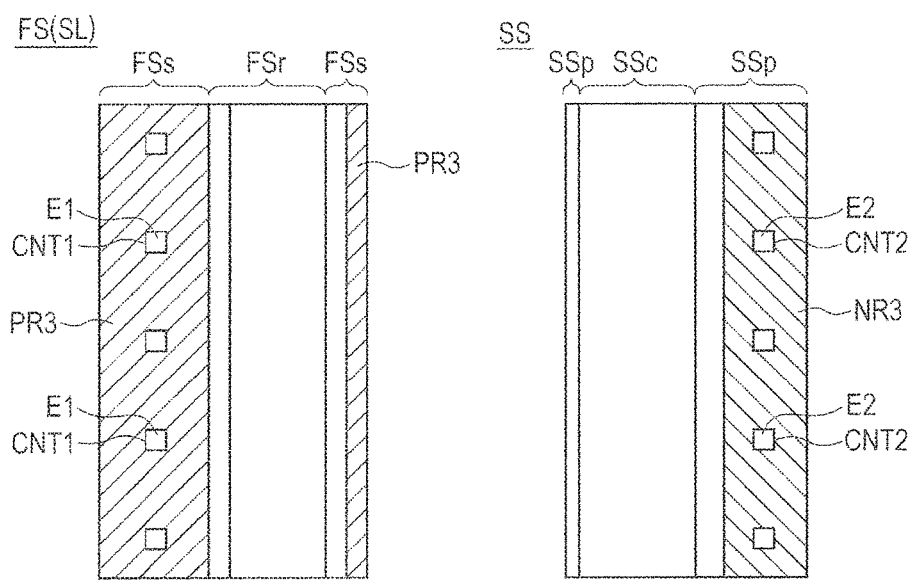
FIG. 38 comprises a plan view showing a substantial part of a first semiconductor layer configuring the semiconductor device in FIG. 37 on the left side and a plan view showing a substantial part of a second semiconductor layer configuring the semiconductor device in FIG. 37 on the right side.
Figure 39:
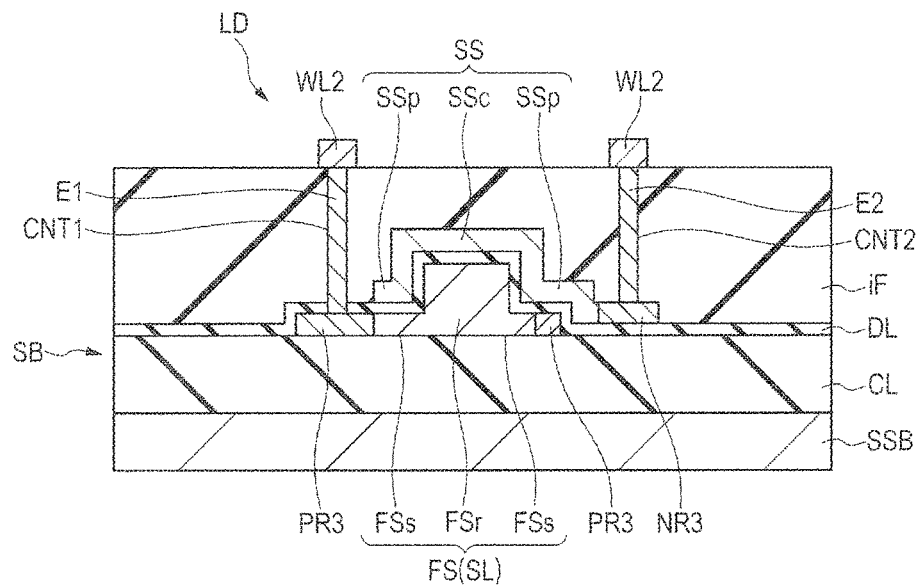
FIG. 39 is a sectional view taken on line I-I in FIG. 37.
Figure 40:
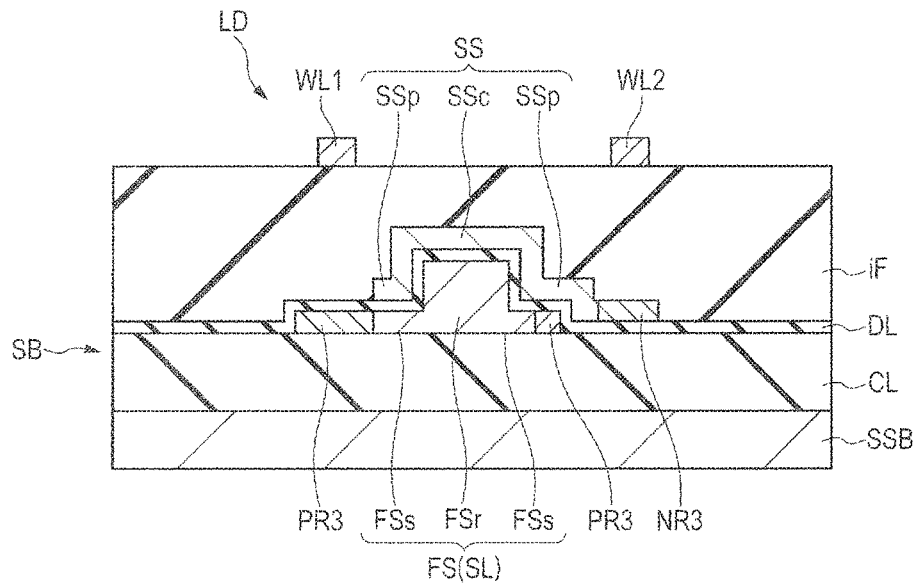
FIG. 40 is a sectional view taken on line II-II in FIG. 37.

FIG. 37 is a plan view showing a substantial part of a semiconductor device according to Second Embodiment, FIG. 38 comprises a plan view showing a substantial part of a first semiconductor layer configuring the semiconductor device in FIG. 37 on the left side and a plan view showing a substantial part of a second semiconductor layer configuring the semiconductor device in FIG. 37 on the right side, FIG. 39 is a sectional view taken on line I-I in FIG. 37, and FIG. 40 is a sectional view taken on line II-II in FIG. 37.

In Second Embodiment, as shown in FIGS. 37, 39, and 40, electrodes E1 to supply a potential to a first semiconductor layer FS are arranged on one side of a rib section FSr in a width direction and electrodes E2 to supply a potential to a second semiconductor layer SS are arranged on the other side of the rib section FSr in a width direction. That is, the electrodes E1 and E2 are arranged on the respective sides of an optical modulator LM with the rib section FSr interposed. In other words, the configuration of supplying potentials to the first semiconductor layer FS and the second semiconductor layer SS is a cantilever configuration.

As shown in FIG. 37 and on the left side in FIG. 38, a slab section FSs on the side of the electrodes E1 protrudes from the rib section FSr up to the lower parts of the electrodes E1 in the first semiconductor layer FS. Further, the slab section FSs on the side of the electrodes E1 is not divided for each of the electrodes E1 and is formed integrally in a propagation direction of light. As shown in FIG. 37, on the left side in FIG. 38, and in FIGS. 39 and 40, a p$^+$-type semiconductor region PR3 is formed in the slab section FSs on the side of the electrodes E1. The electrodes E1 are electrically coupled to the first semiconductor layer FS in the state of being in contact with the p$^+$-type semiconductor region PR3. An impurity concentration of the p$^+$-type semiconductor region PR3 is set so as to be higher than an impurity concentration of the rib section FSr so that the contact state of the electrodes E1 and the slab section FSs may be an ohmic contact state. Then here, as shown in FIGS. 37 and 38, the p$^+$-type semiconductor region PR3 extends in a propagation direction of light in the state of having an equal width. Consequently, the resistance of a potential supply section to the first semiconductor layer FS can be reduced more than First Embodiment stated earlier. A reference potential therefore can be supplied to the first semiconductor layer FS more efficiently and hence the power consumption at an optical waveguide section LD can be reduced yet further. Further, the reference potential can be supplied to the wide range of the first semiconductor layer FS more stably and hence the operational stability of the optical waveguide section LD can be improved yet further.

Further, as shown on the left side of FIG. 38 and in FIGS. 39 and 40, a slab section FSs on the side of the electrodes F2 does not protrude up to the lower parts of the electrodes E2 and terminates between the rib section FSr and the electrodes E2 in the first semiconductor layer FS. That is, a distance from the center of the rib section FSr in a width direction to the outer edge of the slab section FSs on the side of the electrodes E2 is shorter than a distance from the center of the rib section FSr in a width direction to the outer edge of the slab section FSs on the side of the electrodes E1. In the slab section FSs on the side of the electrodes E2, a p$^+$-type semiconductor region PR3 is formed in the state of extending in a propagation direction of light and having an equal width. That is, the p$^+$-type semiconductor regions PR3 and PR3 are formed on both the sides of the rib section FSr in a width direction. As a result, the stability of balance in supplying a carrier to the rib section FSr can be improved.

As shown in FIG. 37 and on the right side in FIG. 38, a peripheral section SSp on the side of the electrodes E2 protrudes from a control section SSc up to the lower parts of the electrodes E2 in the second semiconductor layer SS. Further, the peripheral section SSp on the side of the electrodes E2 is not arranged in multiple pieces but is formed integrally in a propagation direction of light. As shown in FIG. 37, on the right side in FIG. 38, and in FIGS. 39 and 40, an n$^+$-type semiconductor region NR3 is formed in the peripheral section SSp on the side of the electrodes E2. The electrodes E2 are electrically coupled to the n$^+$-type semiconductor region NR3 in the state of being in contact with the n$^+$-type semiconductor region NR3. An impurity concentration of the n$^+$-type semiconductor region NR3 is set so as to be higher than an impurity concentration of the control section SSc so that the contact state of the electrodes E2 and the peripheral section SSp may be an ohmic contact state. Then here, the n$^+$-type semiconductor region NR3 extends in a propagation direction of light in the state of having an equal width. Consequently, the resistance of a potential supply section to the second semiconductor layer SS can be reduced more than First Embodiment stated earlier. A control voltage therefore can be supplied to the second semiconductor layer SS more efficiently and hence the power consumption at an optical waveguide section LD can be reduced yet further. Further, the control voltage can be supplied to the wide range of the second semiconductor layer SS more stably and hence the operational stability of the optical waveguide section LD can be improved yet further.

Further, as shown on the right side in FIG. 38 and in FIGS. 39 and 40, a peripheral section SSp on the side of the electrodes F1 does not protrude up to the lower parts of the electrodes E1 and terminates at an intermediate position between the control section SSc and the electrodes E1 in the second semiconductor layer SS. That is, a distance from the center of the control section SSc in a width direction to the outer edge of the peripheral section SSp on the side of the electrodes E1 is shorter than a distance from the center of the control section SSc in a width direction to the outer edge of the peripheral section SSp on the side of the electrodes E2.

Here, an n[+]-type semiconductor region is not formed in the peripheral section SSp on the side of the electrodes E1.

Furthermore, as shown in FIGS. 37, 39, and 40, wires WL1 to supply a potential to the first semiconductor layer FS and wires WL2 to supply a potential to the second semiconductor layer SS are arranged along the rib section FSr so as not to overlap with the rib section FSr similarly to First Embodiment stated earlier. Note, however, that the wires WL1 are arranged only on one side of the rib section FSr in a width direction and the wires WL2 are arranged only on the other side of the rib section FSr in a width direction. Consequently, the number of the wires WL1 and WL2 can be reduced more than First Embodiment stated earlier.

Moreover, although multiple contact holes CNT1 and CNT2 for forming the electrodes E1 and E2 are arranged in a propagation direction of light here, contact holes CNT1 and CNT2 for forming electrodes E1 and E2 may extend continuously in a propagation direction of light in the case of Second Embodiment.

According to Second Embodiment, the state of potentials supplied to a first semiconductor layer FS and a second semiconductor layer SS can be better. Potentials therefore can be supplied to the first semiconductor layer FS and the second semiconductor layer SS more efficiently and hence the power consumption at an optical waveguide section LD can be reduced yet further. Further, the operational stability of the optical waveguide section LD can be improved yet further.

Further, the configuration of an optical waveguide section LD can be simplified and hence an area occupied by the optical waveguide section LD can be reduced more than First Embodiment stated earlier. As a result, the downsizing, higher integration, and higher functionality of the optical waveguide section LD can be promoted. Other configurations, manufacturing methods, and effects are identical to those in First Embodiment stated earlier.

First Modified Example of Second Embodiment

Figure 41:
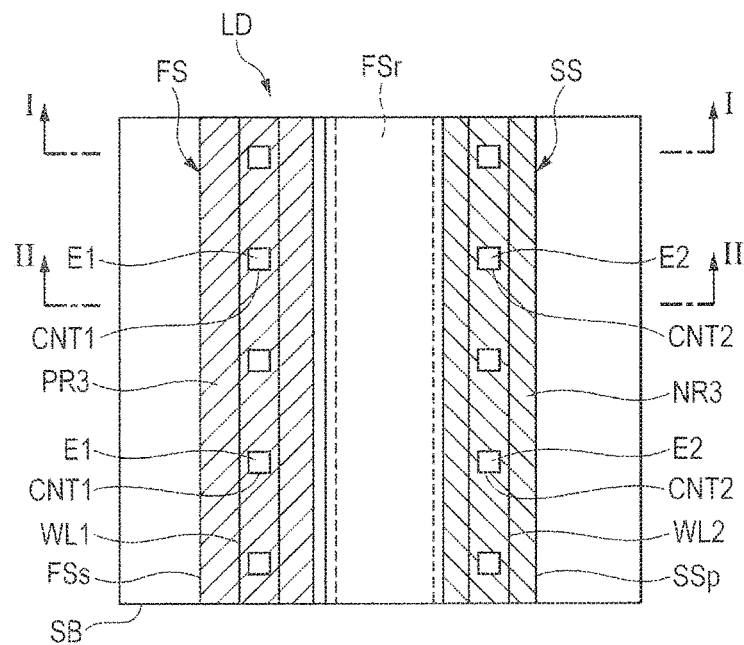
FIG. 41 is a plan view showing a substantial part of a semiconductor device according to First Modified Example of Second Embodiment.
Figure 42:
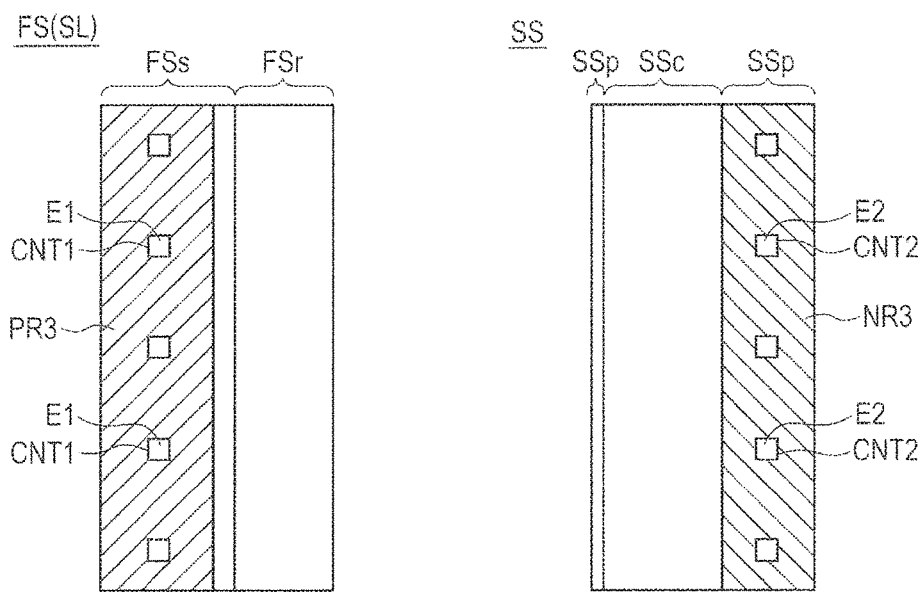
FIG. 42 comprises a plan view showing a substantial part of a first semiconductor layer configuring the semiconductor device in FIG. 41 on the left side and a plan view showing a substantial part of a second semiconductor layer configuring the semiconductor device in FIG. 41 on the right side.
Figure 43:
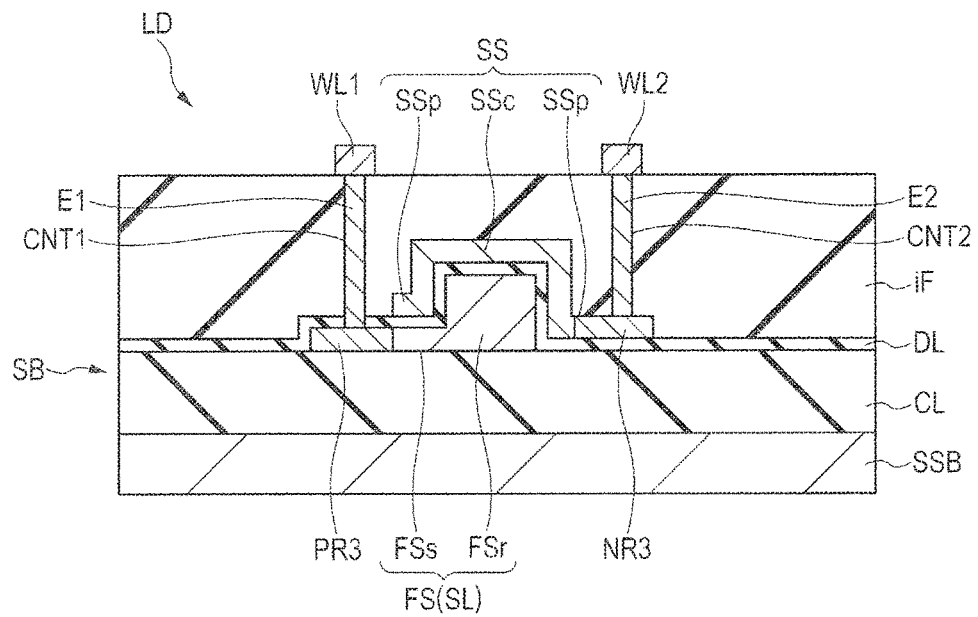
FIG. 43 is a sectional view taken on line I-I in FIG. 41.
Figure 44:
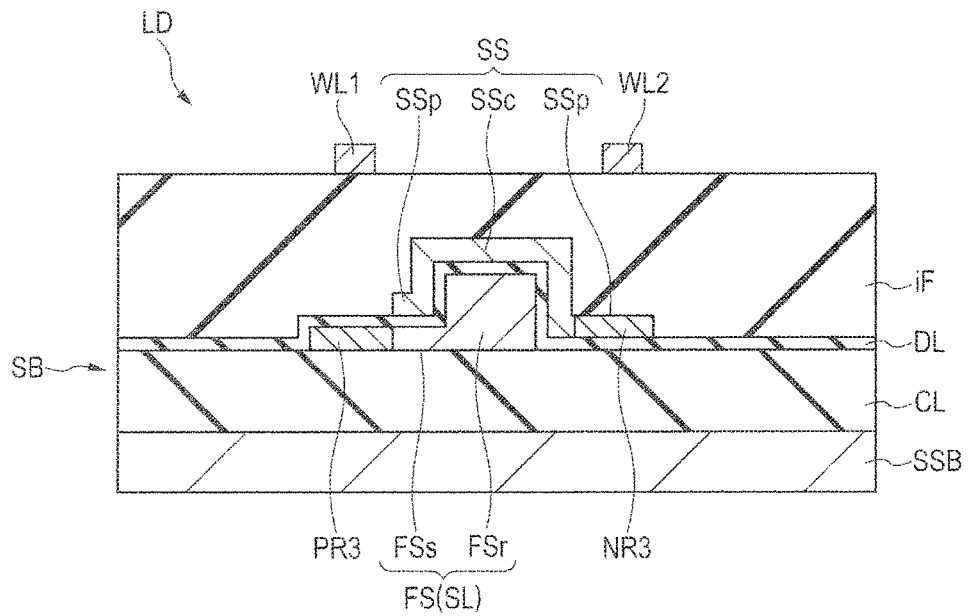
FIG. 44 is a sectional view taken on line II-II in FIG. 41.

FIG. 41 is a plan view showing a substantial part of a semiconductor device according to First Modified Example of Second Embodiment, FIG. 42 comprises a plan view showing a substantial part of a first semiconductor layer configuring the semiconductor device in FIG. 41 on the left side and a plan view showing a substantial part of a second semiconductor layer configuring the semiconductor device in FIG. 41 on the right side, FIG. 43 is a sectional view taken on line I-I in FIG. 41, and FIG. 44 is a sectional view taken on line II-II in FIG. 41.

In First Modified Example of Second Embodiment, as shown in FIG. 41, on the left side in FIG. 42, and in FIGS. 43 and 44, a slab section FSs and a p[+]-type semiconductor region PR3 are formed on one side of a rib section FSr (on the side of electrodes E1) in a width direction in a first semiconductor layer FS similarly to Second Embodiment stated earlier. A slab section FSs and a p[+]-type semiconductor region PR3 however are not formed on the other side of the rib section FSr (on the side of electrodes E2) in a width direction in the first semiconductor layer FS. Consequently, an area occupied by an optical waveguide section LD can be reduced more than Second Embodiment stated earlier. The downsizing and higher functionality of an optical waveguide section LD therefore can be promoted further. Further, a peripheral section SSp on the side of the electrodes E2 can come close to the side of the rib section FSr in the second semiconductor layer SS to the extent of eliminating a slab section FSs on the other side of the rib section FSr (on the side of the electrodes E2) in a width direction in the first semiconductor layer FS. Consequently, a distance between an n[+]-type semiconductor region NR3 and a control section SSc in the second semiconductor layer SS can be reduced more than Second Embodiment stated earlier and hence the resistance of a potential supply section to the second semiconductor layer SS can be reduced more than Second Embodiment stated earlier. A control voltage therefore can be supplied to the second semiconductor layer SS more efficiently and hence the power consumption at an optical waveguide section LD can be reduced yet further. Further, the control voltage can be supplied to a wide range of the second semiconductor layer SS more stably and hence the operational stability of the optical waveguide section LD can be improved yet further. Other configurations, manufacturing methods, and effects are identical to those in Second Embodiment stated earlier.

Although the invention established by the present inventors has heretofore been explained concretely on the basis of the embodiments, it goes without saying that the present invention is not limited to the embodiments and can be modified variously within the range not departing from the tenor of the present invention.

[Note 1]

A manufacturing method of a semiconductor device includes the steps of:

(a) forming an optical waveguide section to propagate light along a first surface of a substrate over the first surface;

(b) depositing a first insulating film over the first surface so as to cover the optical waveguide section;

(c) forming a coupling hole in the first insulating film; and (d) forming an electrode in the coupling hole, in which the step (a) has the steps of:

(a1) forming a first semiconductor layer by patterning a semiconductor layer formed over an insulating layer over the substrate;

(a2) forming a dielectric layer over the insulating layer so as to cover the first semiconductor layer; and (a3) forming a second semiconductor layer over the dielectric layer, in which the first semiconductor layer after the step (a1) has a first part to propagate the light and a second part formed integrally with the first part so as not to overlap with the first part in a plan view, in which the second semiconductor layer of the step (a3) has a third part to cover the first part and a fourth part formed integrally with the third part so as not to overlap with the first part and the second part in a plan view, in which the step (c) has a step of forming a first coupling hole reaching the second part and a second coupling hole reaching the fourth part, and in which the step (d) has a step of forming a first electrode electrically coupled to the second part in the first coupling hole and a second electrode electrically coupled to the fourth part in the second coupling hole.

[Note 2]

In the manufacturing method of a semiconductor device according to Note 1, the second part has a fifth part with which the first electrode comes into contact, and an impurity concentration of the fifth part is higher than an impurity concentration of the first part.

[Note 3]

In the manufacturing method of a semiconductor device according to Note 1, the fourth part has a sixth part with which the second electrode comes into contact, and an impurity concentration of the sixth part is higher than an impurity concentration of the third part.

[Note 4]

In the manufacturing method of a semiconductor device according to Note 1, the second part has a fifth part with which the first electrode comes into contact, the fourth part has a sixth part with which the second electrode comes into contact, and the fifth part and the sixth part are formed so as not to overlap with each other.

[Note 5]

In the manufacturing method of a semiconductor device according to Note 4, the fifth part and the sixth part are formed so as to deviate from each other in a direction of propagating the light in a plan view.

[Note 6]

In the manufacturing method of a semiconductor device according to Note 5, a plurality of the fifth parts and a plurality of the sixth parts are formed in a direction of propagating the light in a plan view.

[Note 7]

In the manufacturing method of a semiconductor device according to Note 6, the second part has seventh parts formed so as to couple two fifth parts adjacent to each other in the fifth parts, first semiconductor regions having a conductivity type identical to the first part and an impurity concentration higher than the first part are formed in the fifth parts, second semiconductor regions having a conductivity type identical to the first part and an impurity concentration higher than the first part are formed in the seventh parts, and the first semiconductor regions in the fifth parts are electrically coupled to each other through the second semiconductor regions, respectively.

[Note 8]

In the manufacturing method of a semiconductor device according to Note 6, the fourth part has eighth parts formed so as to couple two sixth parts adjacent to each other in the sixth parts, third semiconductor regions having a conductivity type identical to the third part and an impurity concentration higher than the third part are formed in the sixth parts, fourth semiconductor regions having a conductivity type identical to the third part and an impurity concentration higher than the third part are formed in the eighth parts, and the third semiconductor regions in the sixth parts are electrically coupled to each other through the fourth semiconductor regions, respectively.

[Note 9]

In the manufacturing method of a semiconductor device according to Note 4, the first electrode and the second electrode deviate from each other in a direction intersecting with a direction of propagating the light and being parallel with the first surface in a plan view.

[Note 10]

In the manufacturing method of a semiconductor device according to Note 9, a distance between the first part and the second electrode is larger than a distance between the first part and the first electrode in a plan view.

[Note 11]

In the manufacturing method of a semiconductor device according to Note 1, at the step (a1), the first part is formed so as to be thicker than the second part and protrude from the upper surface of the second part, at the step (a2), the dielectric layer is formed so as to cover the upper surface and side surfaces of the first part, and at the step (a3), the third part is formed so as to cover the upper surface and side surfaces of the first part.

[Note 12]

In the manufacturing method of a semiconductor device according to Note 1, a plurality of the first electrodes, a plurality of the second parts, a plurality of the second electrodes, and a plurality of the fourth parts are formed, the first electrodes are arranged on both the sides of the first part in a direction intersecting with a direction of propagating the light and being parallel with the first surface in a plan view, the second parts are arranged on both the sides of the first part in a direction intersecting with a direction of propagating the light and being parallel with the first surface in a plan view, the second electrodes are arranged on both the sides of the first part in a direction intersecting with a direction of propagating the light and being parallel with the first surface in a plan view, and the fourth parts are arranged on both the sides of the first part in a direction intersecting with a direction of propagating the light and being parallel with the first surface in a plan view.

[Note 13]

In the manufacturing method of a semiconductor device according to Note 1, the first electrode and the second electrode are arranged so as to interpose the first part in a direction intersecting with a direction of propagating the light and being parallel with the first surface in a plan view, the second part is arranged on the side where the first electrode is arranged in a plan view, and the fourth part is arranged on the side where the second electrode is arranged in a plan view.

[Note 14]

In the manufacturing method of a semiconductor device according to Note 1, the first semiconductor layer comprises a p-type semiconductor and the second semiconductor layer comprises an n-type semiconductor.

What is claimed is:

1. A semiconductor device comprising:
    a substrate;
    an optical waveguide section to be arranged over a first surface of the substrate and propagate light along the first surface; and
    a first insulating film formed over the first surface so as to cover an upper surface and a side surface of the optical waveguide section,
    wherein the optical waveguide section includes:
    a first semiconductor layer formed over the first surface;
    a dielectric layer formed over the first semiconductor layer; and
    a second semiconductor layer formed over the dielectric layer,
    wherein the first semiconductor layer has:
    a first part to propagate the light; and
    a second part formed integrally with the first part so as not to overlap with the first part in a plan view,
    wherein the second semiconductor layer has:
    a third part formed so as to cover the first part; and
    a fourth part formed integrally with the third part so as not to overlap with the first part and the second part in a plan view, wherein a first coupling hole reaching the second part and a second coupling hole reaching the fourth part are formed in the first insulating film, wherein a first electrode electrically coupled to the second part is formed in the first coupling hole, wherein a second electrode electrically coupled to the fourth part is formed in the second coupling hole; and wherein the first semiconductor layer is arranged but the second semiconductor layer is not arranged between the first electrode and the substrate, and the second semiconductor layer is arranged but the first semiconductor layer is not arranged between the second electrode and the substrate.

2. The semiconductor device according to claim 1,
wherein the second part has a fifth part with which the first electrode comes into contact, and
wherein an impurity concentration of the fifth part is higher than an impurity concentration of the first part.

3. The semiconductor device according to claim 1,
wherein the fourth part has a sixth part with which the second electrode comes into contact, and
wherein an impurity concentration of the sixth part is higher than an impurity concentration of the third part.

4. The semiconductor device according to claim 1,
wherein the second part has a fifth part with which the first electrode comes into contact,
wherein the fourth part has a sixth part with which the second electrode comes into contact, and
wherein the fifth part and the sixth part are arranged so as not overlap with each other.

5. The semiconductor device according to claim 4, wherein the fifth part and the sixth part deviate from each other in a direction of propagating the light in a plan view.

6. The semiconductor device according to claim 5, wherein a plurality of the fifth parts and a plurality of the sixth parts are arranged respectively in a direction of propagating the light in a plan view.

7. The semiconductor device according to claim 6,
wherein the second part has seventh parts adjacent to the fifth parts,
wherein the fifth parts include first semiconductor regions having a conductivity type identical to the first part and an impurity concentration higher than the first part,
wherein the seventh parts include second semiconductor regions having a conductivity type identical to the first part and an impurity concentration higher than the first part, and
wherein the first semiconductor regions in the fifth parts are electrically coupled to each other through the second semiconductor regions, respectively.

8. The semiconductor device according to claim 6,
wherein the fourth part has eighth parts formed so as to couple two sixth parts adjacent to each other in the sixth parts,
wherein the sixth parts include third semiconductor regions having a conductivity type identical to the third part and an impurity concentration higher than the third part,
wherein the eighth parts include fourth semiconductor regions having a conductivity type identical to the third part and an impurity concentration higher than the third part, and
wherein the third semiconductor regions in the sixth parts are electrically coupled to each other through the fourth semiconductor regions, respectively.

9. The semiconductor device according to claim 4,
wherein the first electrode and the second electrode deviate from each other in a direction intersecting with a direction of propagating the light and being parallel with the first surface in a plan view.

10. The semiconductor device according to claim 9,
wherein a distance between the first part and the second electrode is larger than a distance between the first part and the first electrode in a plan view.

11. The semiconductor device according to claim 1,
wherein the first part is formed so as to be thicker than the second part and protrude from the upper surface of the second part, and the dielectric layer and the third part are formed so as to cover the upper surface and the side surfaces of the first part.

12. The semiconductor device according to claim 1,
wherein a plurality of the first electrodes, a plurality of the second electrodes, a plurality of the second parts, and a plurality of the fourth parts are formed, respectively,
wherein the first electrodes are arranged on both the sides of the first part in a direction intersecting with a direction of propagating the light and being parallel with the first surface in a plan view,
wherein the second parts are arranged on both the sides of the first part in a direction intersecting with a direction of propagating the light and being parallel with the first surface in a plan view,
wherein the second electrodes are arranged on both the sides of the first part in a direction intersecting with a direction of propagating the light and being parallel with the first surface in a plan view, and
wherein the fourth parts are arranged on both the sides of the first part in a direction intersecting with a direction of propagating the light and being parallel with the first surface in a plan view.

13. The semiconductor device according to claim 1,
wherein the first electrode and the second electrode are arranged so as to interpose the first part in a direction intersecting with a direction of propagating the light in a plan view,
wherein the second part is arranged on the side where the first electrode is arranged in a plan view, and
wherein the fourth part is arranged on the side where the second electrode is arranged in a plan view.

14. The semiconductor device according to claim 1,
wherein the first semiconductor layer comprises a p-type semiconductor and the second semiconductor layer comprises an n-type semiconductor.

* * * * *